(12) United States Patent
Taylor

(10) Patent No.: US 11,574,153 B2
(45) Date of Patent: Feb. 7, 2023

(54) IDENTIFYING ORGANISMS FOR PRODUCTION USING UNSUPERVISED PARAMETER LEARNING FOR OUTLIER DETECTION

(71) Applicant: Zymergen Inc., Emeryville, CA (US)

(72) Inventor: Amelia Taylor, Bend, OR (US)

(73) Assignee: Zymergen Inc., Emeryville, CA (US)

(*) Notice: Subject to any disclaimer, the term of this patent is extended or adjusted under 35 U.S.C. 154(b) by 309 days.

(21) Appl. No.: 16/768,533

(22) PCT Filed: Nov. 30, 2018

(86) PCT No.: PCT/US2018/063297
§ 371 (c)(1),
(2) Date: May 29, 2020

(87) PCT Pub. No.: WO2019/108926
PCT Pub. Date: Jun. 6, 2019

(65) Prior Publication Data
US 2020/0311489 A1    Oct. 1, 2020

Related U.S. Application Data

(60) Provisional application No. 62/593,757, filed on Dec. 1, 2017.

(51) Int. Cl.
*G06K 9/62* (2022.01)
*G06F 17/18* (2006.01)
*G06N 7/00* (2006.01)

(52) U.S. Cl.
CPC .......... *G06K 9/6284* (2013.01); *G06F 17/18* (2013.01); *G06K 9/6219* (2013.01); *G06N 7/005* (2013.01)

(58) Field of Classification Search
CPC ............................. G06K 9/6284; G06F 17/18
See application file for complete search history.

(56) References Cited

U.S. PATENT DOCUMENTS

2013/0294677 A1* 11/2013 Urano ................. G01N 21/956
                                                                    382/141
2017/0316353 A1    11/2017 Frewen et al.

FOREIGN PATENT DOCUMENTS

WO        2017189784 A1    11/2017

OTHER PUBLICATIONS

Bergstra et al, Algorithms for hyper-parameter optimization, In Advances in Neural Information Processing Systems, 2011, 2546-2554.

(Continued)

*Primary Examiner* — Bryan Bui
(74) *Attorney, Agent, or Firm* — Almanac IP Advisors LLP

(57) ABSTRACT

Systems, methods and computer-readable media are provided for identifying organisms for production. The identification is based upon determining one or more outlier detection parameters for identifying outliers (e.g., outlier wells, strains, plates holding organisms) from a data set of organism performance metrics. A prediction engine may identify one or more candidate outliers based upon a first set of outlier detection parameters (e.g., outlier detection threshold), and determine probability metrics that represent likelihoods that candidate outliers belong to an outlier class. Based on those metrics, some of the outliers may be excluded from consideration in predicting organism performance for the purpose of selecting organisms for production.

25 Claims, 14 Drawing Sheets

(56) References Cited

OTHER PUBLICATIONS

Buitinck et al, API design for machine learning software: experiences from the scikit-learn project, 2013, scikit-learn v0.19.1.
Campos et al, On the evaluation of unsupervised outlier detection: Measures, datasets, and an empirical study. Data Mining and Knowledge Discovery, 2016.
Chernoff, Sequential Design of Experiments, The Annals of Mathmatecial Statistics, 1959, 755-770.
Conn et al, 2009, Introduction to derivative-free optimization, SIAM, 2 pgs.
Dahl, et al., Multi-task Neural Networks for QSAR Predictions, Dept. of Computer Science, Univ. of Toronto, Jun. 2014, 21 pgs.
Ginebra et al, Response Surface Bandits, Journal of the Royal Statistical Society, Series B (Methodological) 57, 4 (1995), 771-784.
Goldstein et al, A comparative Evaluation of Unsupervised Anomaly Detection Algorithms for Multivariate Data, PLoS One, Published Apr. 19, 2016, 31 pgs.
Golovin et al, Google Vizier: A Service for Black-Box Optimization, In Proceedings of the 23rd ACM SIGKDD International Conference on Knowledge Discovery and Data Mining, 2017, 1487-1495.
GPU-Based Deep Learning Inference: A Performance and Power Analysis, NVidia Whitepaper, Nov. 2015, 12 pgs.
Himura et al, An evaluation of automatic parameter tuning of a statistics-based anomaly detection algorithm, International Journal of Network Management, 2010, 295-316.
International Search Report for PCT/US2018/063297 dated Feb. 20, 2019, 2 pgs.
Kashyap et al., Big Data Analytics in Bioinformatics: A Machine Learning Perspective, Journal of Latex Class Files, vol. 13, No. 9, Sep. 2014, 20 pgs.
Leng et al., Classification using functional data analysis for temporal gene expression data, Bioinformatics, vol. 22, No. 1, Oxford University Press (2006), pp. 68-76.
Li et al, Hyperband: A Novel Bandit-Based Approach to Hyperparameter Optimization, Journal of Machine Learning Research 18, Submitted Nov. 2016, 1-52.
Libbrecht et al., Machine learning applications in genetics and genomics, Nature Reviews: Genetics, vol. 16, Jun. 2015, 30 pgs.
Marques et al, On the internal evaluation of unsupervised outlier detection, In: Proceedings of the 27th international conference on scientific and statistical database management, SSDBM, vol. 7, Jun. 29, 2015, pp. 1-12.
Pedregosa et al., Scikit-learn: Machine Learning in Python, Journal of Machine Learning Research 12, pp. 2825-2830, 2011.
Prompramote, et al., Machine Learning in Bioinformatics, Chapters of Bioinformatics Technologies, pp. 117-153, Springer Berlin Heidelberg 2005.
Rios et al, Derivative-free optimization: a review of algorithms and comparison of software implementations, Journal of Global Optimization 56, 2013, 1247-1293.
Rousseeuw et al, A fast algorithm for the minimum covariance determinant estimator, Technometrics 41(3), 212 (1999), 31 pgs.
Shahriari et al, Taking the human out of the loop: A review of bayesian optimization, Proc. IEEE vol. 104, No. 1, 2016, 148-175.
Shevade, A simple and efficient algorithm for gene selection using sparse logistic regression, Bioinformatics, vol. 19, No. 17 2003, pp. 2246-2253.
Snoek et al, Practical bayesian optimization of machine learning algorithms, In Advances in neural information processing systems, 2012, 2951-2959.
Srinivas et al, Gaussian Process Optimization in the Bandit Setting: No Regret and Experimental Design, ICML (2010), 17 pgs.
Written Opinion for PCT/US2018/063297 dated Feb. 20, 2019, 9 pgs.

* cited by examiner

IDENTIFYING ORGANISMS FOR PRODUCTION USING UNSUPERVISED PARAMETER LEARNING FOR OUTLIER DETECTION

CROSS-REFERENCE TO RELATED APPLICATIONS

This application is a national stage entry of International Application No. PCT/US2018/063297, filed on Nov. 30, 2018, which claims the benefit of priority to U.S. Provisional Application No. 62/593,757, filed Dec. 1, 2017, both of which are hereby incorporated by reference in their entirety.

BACKGROUND

Field of the Disclosure

The disclosure relates generally to the fields of metabolic and genomic engineering, and more particularly to the field of high throughput ("HTP") genetic modification of organisms such as microbial strains to produce products of interest.

Description of Related Art

The subject matter discussed in the background section should not be assumed to be prior art merely due to its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Genetically optimizing an organism to exhibit a desired phenotype is a well-known problem. One question is, of all the possible modifications that might be made to the organism, which should be attempted to maximize output of the desired compound?Automated laboratory equipment enables the implementation and assessment of hundreds or thousands of genetic modifications to microbes within a short time frame. Based upon historical assessments of such modifications, predictive models can be built to predict the likelihood that given genetic modifications will yield a desired phenotypic performance. Using predictive modeling thus enables the designer to more efficiently select the genetic modifications to be physically made in a gene manufacturing system to achieve a phenotype of interest.

Predictive models used in genomic engineering (e.g., linear regression) result in the generation of a fit line estimating the mapping of independent variables to predicted variables such as microbe performance (e.g., titer, biomass). Often, however, some strains behave very differently from the rest, and their observed performance may be spatially isolated from the other strains closer to the fit line. Such outlier strains affect the fit of the model and can impair predictive power for all the other strains while still being poorly predicted themselves. One optimization is to remove the outlier strains to improve the overall predictive power of the model.

Outlier and anomaly detection are discussed extensively in the literature, but work continues to find better models for this purpose. Many of these models (all generally well-known) have parameters that must be learned from the data for the algorithm to work well. This is often referred to as "parameter tuning" in the literature. Parameter tuning/learning is a standard step in machine learning. These parameters vary depending on the particular data one is analyzing. For example, one expects parameters to depend on the host organism, the media in which the microbes are grown, machines used in the process, etc. As such, one would expect to use the data to learn these parameters each time one onboards a new project, and to revisit these parameters throughout the evolution of a program.

There are well established techniques for parameter learning when the data is supervised, meaning that there is a known ground truth. In this context, one would know which values in the data are outliers and which are not. As an analogy, if one is trying to learn parameters in a model that classifies a group of people as being male vs. female, it is possible to have a dataset where one knows definitively which people are male and which are female. One can then use that information to build a model that classifies the sex of the people for whom one has the input data, but does not yet know their sex. Many projects involving outlier detection do not have any ground truth, e.g., a data set with objectively labeled points.

This is generally true of all outlier detection algorithms, but it is only very recently that this issue has started to give rise to effective papers in the literature. One reason for this may be the use of "semi-supervised" data where a human subjectively (or in the case of anomalies, it may be more objective) labels the data so that well-understood supervised techniques may be used. This approach, however, may not be not an option in many circumstances because of challenges such as the large quantity of data and limited resources involved with high throughput genomic modifications, the need to recalibrate/retrain every time the algorithm may need an update, or when a new project for optimizing phenotypic performance, e.g., yield, biomass, for the production of products of interest, (based upon predictive models) is undertaken. Moreover, it is generally recognized that the semi-supervised approach relies on a biased human decision about what constitutes an outlier, as compared to a robust statistical model.

Thus, it is desired to determine the parameters for a robust statistical model without a ground truth identifying which data points are truly outliers.

SUMMARY OF THE DISCLOSURE

The disclosure references a few notable papers that address the issue of unsupervised parameter learning, all of which are incorporated in their entirety herein:

Campos, Zimek, Sander, Campello, Micenkova, Schubert, Assent, and Houle: On the evaluation of unsupervised outlier detection: Measures, datasets, and an empirical study. Data Mining and Knowledge Discovery, 2016. http://doi.org/10.1007/s10618-015-0444-8

Goldstein M, Uchida S. A comparative Evaluation of Unsupervised Anomaly Detection Algorithms for Multivariate Data. PLoS ONE 11(4):e0152173. doi:10.1371/journal.pone.0152173 Published Apr. 19, 2016.

Himura, Y., Fukuda, K., Cho, K. and Esaki, H. (2010), An evaluation of automatic parameter tuning of a statistics-based anomaly detection algorithm. Int. J. Network Mgmt., 20: 295-316. doi:10.1002/nem.749

Marques H O, Campello R J G B, Zimek A, Sander J (2015) On the internal evaluation of unsupervised outlier detection. In: Proceedings of the 27th international conference on scientific and statistical database management (SSDBM), San Diego, pp 7:1-12. doi:10.1145/2791347.2791352

Campos et. al. and Goldstein, et. al. compare multiple fundamentally different algorithms, rather than focus on parameter tuning. Their approach, however, is not directly applicable to the challenges described above. And while they utilize multiple data sets in their studies, they use a single data set at a time for the comparison. A third paper, Himura et. al. is focused on parameter tuning, but for anomaly detection. That paper uses a single parameter, the metric is a fairly simple one, and their focus is more on how this parameter is important in the type of time series data with which they are concerned.

The disclosure also references a few notable papers that address the issue of "black box optimization" which lies in several scholarly fields, all of which are incorporated in their entirety herein:

James S Bergstra, R'emi Bardenet, Yoshua Bengio, and Bal'azs K'egl. 2011. Algorithms for hyper-parameter optimization. In Advances in Neural Information Processing Systems. 2546-2554.

Herman Chernoff. 1959. Sequential Design of Experiments. Ann. Math. Statist. 30, 3 (09 1959), 755-770. https://doi.org/10.1214/aoms/1177706205

Andrew R Conn, Katya Scheinberg, and Luis N Vicente. 2009. Introduction to derivative-free optimization. SIAM.

Josep Ginebra and Murray K. Clayton. 1995. Response Surface Bandits. Journal of the Royal Statistical Society. Series B (Methodological) 57, 4 (1995), 771-784. http://www.j stor.org/stable/2345943

Daniel Golovin, Benjamin Solnik, Subhodeep Moitra, Greg Kochanski, John Karro, D. Sculley. 2017. Google Vizier: A Service for Black-Box Optimization. In Proceedings of the 23rd ACM SIGKDD International Conference on Knowledge Discovery and Data Mining. 1487-1495.

Lisha Li, Kevin G. Jamieson, Giulia DeSalvo, Afshin Rostamizadeh, and Ameet Talwalkar. 2016. Hyperband: A Novel Bandit-Based Approach to Hyperparameter Optimization. CoRR abs/1603.06560 (2016). http://arxiv.org/abs/1603.06560

Luis Miguel Rios and Nikolaos V Sahinidis. 2013. Derivative-free optimization: a review of algorithms and comparison of software implementations. Journal of Global Optimization 56, 3 (2013), 1247-1293.

Bobak Shahriari, Kevin Swersky, Ziyu Wang, Ryan P Adams, and Nando de Freitas. 2016. Taking the human out of the loop: A review of bayesian optimization. Proc. IEEE 104, 1 (2016), 148-175.

Jasper Snoek, Hugo Larochelle, and Ryan P Adams. 2012. Practical bayesian optimization of machine learning algorithms. In Advances in neural information processing systems. 2951-2959.

Niranjan Srinivas, Andreas Krause, Sham Kakade, and Matthias Seeger. 2010. Gaussian Process Optimization in the Bandit Setting: No Regret and Experimental Design. ICML (2010).

Recognizing these limitations, the inventor makes use of the ideas in a paper by Marques, et. al. The metric presented in this paper is focused on parameter tuning. However, while the underlying idea of Marques et al. is useful, the genomic data addressed by the inventor in this disclosure presents unique challenges.

There are many different ways to group the biological data considered in this disclosure for the purpose of tuning parameters. The objective may be to determine outliers within the group of all data in an experiment, or determining outliers for a particular plate of measurements, or determining outliers in the measurements for a single strain. In embodiments of the disclosure, an "experiment" refers to a group of organisms (e.g., strains on plates) that are processed through a gene manufacturing system ("factory") together under the same conditions to produce genetically modified microbes and collect observation data. Typically, when the organisms are microbial strains, the strains are associated with each other via the same ancestor strain.

FIG. 1A illustrates biomass measurements for three plates grouped along the y axis, in which each sample point represents measurement of biomass for a single well (holding a single strain replicate) on a plate. FIG. 1B illustrates titer measurements for six strains grouped along the y axis, in which each sample point represents measurement of titer for a single well on a plate. In these examples, the objective is to determine outlier wells (strain replicates). In FIG. 1A, the grouping of strain replicates (corresponding to wells) is by plate, whereas in FIG. 1B the grouping of strain replicates is by strain.

These figures, produced using one set of parameters within a standard outlier detection model (based on elliptic envelopes), raise questions about where the boundary for outlier vs. inlier should be drawn. Further, for the biomass assay of the figure, it is reasonable to consider all the measurements from a plate, or even a single high throughput screening (HTS) experiment, as samples from the same distribution. However, in the titer assay, it is apparent that the samples are definitely not from the same distribution; no performance (e.g., yield) threshold can be easily drawn for the group of strains that would demarcate the outliers. Thus, it is important to consider outlier detection at a different granularity/grouping of the data. However, for operational and modeling reasons, it is impractical to employ separate model parameters for each strain, or even each experiment. Therefore, the inventor recognized the need to take the metric presented in Marques, et. al. and effectively modify it to tune parameters for outlier detection algorithms that work well across strains and across experiments.

Genomic engineering integrates robotics, software and biology to provide predictability and reliability to the process of rapidly improving microbial strains through genetic engineering. One critical part of this process is rapid, robust and useful processing of data to provide scientists with the information they need to make the next round of changes and decide which strains to promote. In particular, robots may run hundreds of experiments in parallel and analytical automation enables cleaning and processing of the data in near real time.

A first step is to identify outliers that arise in the data due to multiple opportunities for process failure. With this comes both the challenge of modeling outliers, and the problem of model evaluation for both selecting a model and tuning parameters. In particular, embodiments of the disclosure address the problem of evaluating models for the purpose of tuning parameters for a single model, although these insights also facilitate comparison between different outlier detection models. This is not about the algorithm for initially detecting the outliers. Novel insights include dealing with both univariate and multivariate data and developing the methods in the context of high throughput engineering where a single set of parameters is desired to work across time and across diverse biological strains.

Embodiments of the disclosure provide systems, methods and computer-readable media storing instructions for identifying organisms for production in, for example, a gene manufacturing system. The identification is based at least in part upon determining one or more outlier detection parameters for identifying outlier objects from a collection of objects. According to embodiments of the disclosure:

(a) A prediction engine may identify one or more candidate outlier objects (e.g., representing a plate comprising wells) from a data set based at least in part upon a first set of one or more outlier detection parameters (e.g., outlier detection threshold), where the data set comprises a set of performance metrics, each metric representing organism phenotypic performance (e.g., production of a product of interest, yield, biomass) corresponding to an object of the collection of objects.

(b) The prediction engine may determine a set of probability metrics, each probability metric representing a likelihood that the one or more candidate outlier objects belongs to an outlier class.

(c) The prediction engine may process the probability metrics within the set of probability metrics to generate a set of aggregate probability metrics. The prediction engine may process the probability metrics for each experiment to generate intermediate, experiment-specific aggregate probability metrics.

(d) The prediction engine may select a second set of one or more outlier detection parameters based at least in part upon the magnitude (e.g., representing a greatest likelihood) of the aggregate probability metrics.

(e) The prediction engine may identify one or more second outlier objects of the data set based at least in part upon the second set of outlier detection parameters, where the one or more second outlier objects are to be excluded from consideration in predicting organism performance for the purpose of selecting organisms for production.

The prediction engine may exclude the one or more second outlier objects from the data set to form a sample set, and predict performance of the organism based on the sample set. According to embodiments of the disclosure, a factory order placer may select at least one organism for production based at least in part upon the predicted performance. Examples of a factory order placer and a gene manufacturing system are described in International Application No. PCT/US2017/029725, filed on Apr. 26, 2017, which claims the benefit of priority to U.S. non-provisional application Ser. No. 15/140,296, filed on Apr. 27, 2016, both of which are hereby incorporated by reference in their entirety. According to embodiments of the disclosure, the gene manufacturing systems may manufacture the selected organisms.

According to embodiments of the disclosure, the objects for which outliers are determined may not reside at the same level of granularity as the grouping of those objects. For example, in FIGS. 1A and 1B, each object is a strain replicate (physically residing in a well), whereas the performance measurements of the strain replicates are grouped into three plate groupings in FIG. 1A and into different strain groupings in FIG. 1B. According to embodiments of the disclosure, the term "object" refers to a member of a grouping at a level of granularity, examples of objects being a well (holding a strain replicate), a strain, a plate, a tank, or an experiment.

For purposes of computing a set of optimum outlier detection parameters, the objects (e.g. strain replicates physically residing in wells) for which outliers are determined may be grouped in groups at coarser levels of granularity (e.g., plates) than the level of granularity of the object (e.g., strain replicate/well) itself. The coarser levels may be thought of as "higher" levels in a hierarchy of grouping.

For example, in embodiments, a useful hierarchy in order of lower to higher (finer to coarser) levels may be considered as: strain replicate (or well)→strain (e.g., *E. Coli*)→plate→experiment. The performance data for an object may be grouped at a coarser (higher) level of granularity than the object itself. As examples, performance data for strain replicates, for which outlier wells are to be determined, may be grouped by strain (as in FIG. 1B), plate (as in FIG. 1A), or experiment, whereas performance data for plates, for which outlier plates are to be determined, may be grouped by experiment.

In embodiments, each object may represent a strain replicate, and identifying one or more candidate outlier objects may comprise grouping the strain replicates in the data set by strain, by plate, or by experiment.

According to embodiments of the disclosure, the determination of a set of probability metrics comprises employing logistic regression, where the probability metric is a chance adjusted metric. The logistic regression may employ a kernel. Samples of the first data set may be jittered in a dimension orthogonal to a dimension of the organism performance in logistic regression space.

The prediction engine may enable selection of an optimal outlier detection algorithm from among a set of outlier detection algorithms. The prediction engine may generate a set of aggregate probability metrics for each algorithm of the set of outlier detection algorithms, identify the largest aggregate probability metric from a set of aggregate probability metrics, and select the outlier detection algorithm associated with the largest aggregate probability metric as an optimal outlier detection algorithm.

Embodiments of the disclosure include an organism produced by any one of the methods described herein.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

Figure 2:
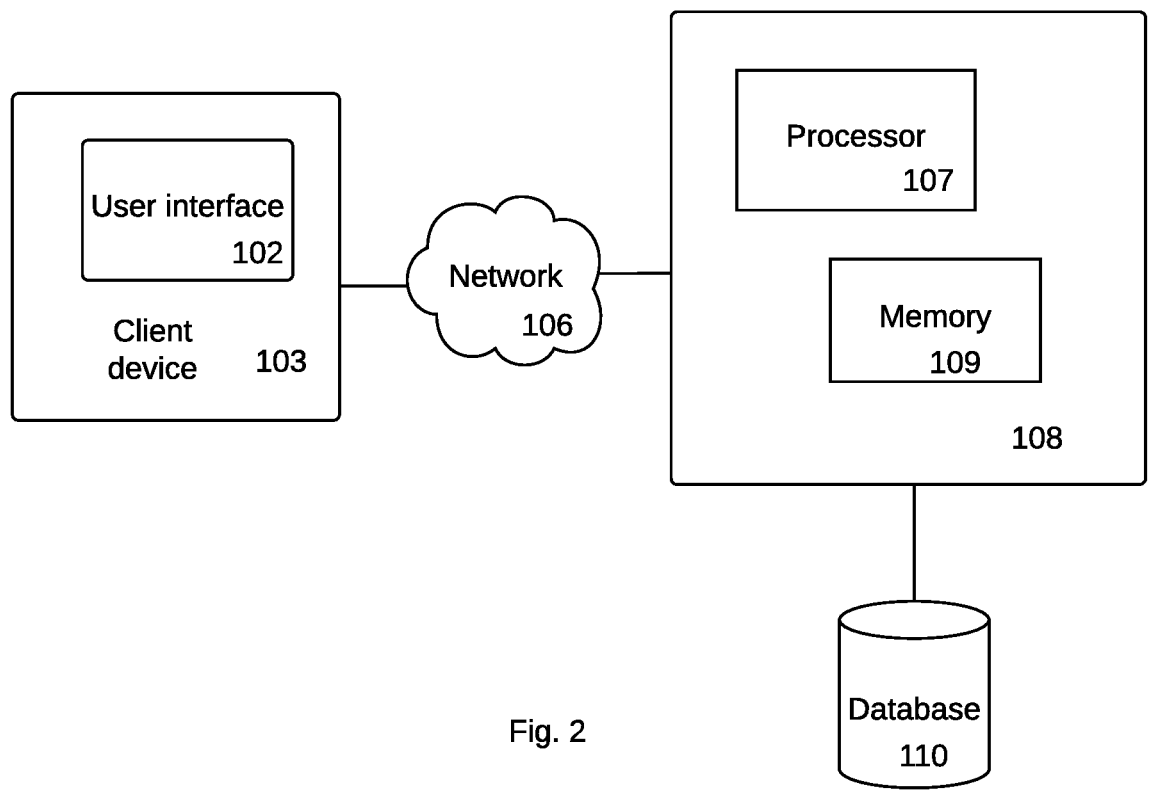
FIG. 2 illustrates a client-server computer system for implementing embodiments of the disclosure.

FIG. 2 illustrates a distributed system 100 of embodiments of the disclosure. A user interface 102 includes a client-side interface such as a text editor or a graphical user interface (GUI). The user interface 102 may reside at a client-side computing device 103, such as a laptop or desktop computer. The client-side computing device 103 is coupled to one or more servers 108 through a network 106, such as the Internet.

The server(s) 108 are coupled locally or remotely to one or more databases 110, which may include one or more corpora of libraries including data such as genome data, genetic modification data (e.g., promoter ladders), and phenotypic performance data that may represent microbial strain performance in response to genetic modifications.

In embodiments, the server(s) 108 includes at least one processor 107 and at least one memory 109 storing instructions that, when executed by the processor(s) 107, predict phenotypic performance of gene modifications, thereby acting as a "prediction engine" according to embodiments of the disclosure. Alternatively, the software and associated hardware for the prediction engine may reside locally at the client 103 instead of at the server(s) 108, or be distributed between both client 103 and server(s) 108. In embodiments, all or parts of the prediction engine may run as a cloud-based service, depicted further in FIG. 10.

The database(s) 110 may include public databases, as well as custom databases generated by the user or others, e.g., databases including molecules generated via synthetic biology experiments performed by the user or third-party contributors. The database(s) 110 may be local or remote with respect to the client 103 or distributed both locally and remotely.

High Level Process Description

As an example, a gene manufacturing system may apply multiple different genetic changes to a single base microbe (e.g., *E. coli*) to produce different strains of the microbe. Analysis equipment of the system may measure how well these strains grow (biomass) and how much product they produce (titer). To do so, multiple replicates of each of the many different strains may be placed in plates (e.g., replicates of each strain are placed in each well of a group of wells in a 96-well plate). In this example, a single process run may employ many of these 96-well plates holding many replicates of many different strains.

The system may compute the biomass and titer for these many replicates of these many strains. It may compute these metrics at the same or different times, e.g., 24 hours and 96 hours for productivity and yield respectively. The discussion immediately below will consider these different collections of assays (biomass and titer) as a single collection of biomass and titer measurements at a time.

Thus, for a single collection of assays on a set of plates, the system will determine for each strain a distribution of measurements based upon the measurements on the multiple replicates of that strain. Outliers in this distribution can occur for many reasons, and this disclosure is particularly concerned with outliers occurring due to process failure and identifying these statistical outliers using rigorous statistical techniques, preferably in real-time.

For statistical identification of these measurement outliers, the system of embodiments of the disclosure may use a publicly available outlier detection algorithm, but such an algorithm has input parameters (detailed below) that need to be learned from the data. As discussed above, learning parameters for algorithms for which there is no ground truth, e.g. the data is not supervised, is a difficult problem. The disclosure next provides details of embodiments of the disclosure and optimizations for this problem.

The primary example disclosed herein concerns optimizations grouped as measurements of samples from a single distribution of replicates of a single strain. However, for some assays, like biomass, there are other groupings (i.e., levels of granularity) that may be a more scientifically rigorous grouping, such as plate or experiment. The optimizations of embodiments of the disclosure that solve the challenges described above work at any choice of grouping. The primary example concerns strain grouping as a simple example for the purposes of explaining the challenges and optimizations.

The Parameters

According to embodiments of the disclosure, the prediction engine may implement outlier detection by using the minimum covariance determinant and elliptic envelope to obtain a robust estimate of the covariance to compute the Mahalanobis distance. An example of this technique is described in Rousseeuw, P. J., Van Driessen, K. "A fast algorithm for the minimum covariance determinant estimator" Technometrics 41(3), 212 (1999); and may be implemented with the software described in *Scikit-learn: Machine Learning in Python*, Pedregosa et al., JMLR 12, pp. 2825-2830, 2011,

*API design for machine learning software: experiences from the scikit-learn project*, Buitinck et al., 2013, scikit-learn v0.19.1, each incorporated by reference in its entirety herein. The distance provides a "score" for each point. The critical parameter to tune is the Mahalanobis distance beyond which a point is considered to be an outlier. In practice, the prediction engine may use residuals (e.g. the difference between value and sample median) for determining outliers. For that reason, the Mahalanobis distance parameter may be deemed the "residual_threshold" (otherwise referred to herein as "residual threshold") according to embodiments of the disclosure.

The following is an example of covariance estimation with the Mahalanobis distances on Gaussian distributed data. For Gaussian distributed data, the distance of an observation $x_i$ to the mode of the distribution can be computed using its Mahalanobis distance: $d_{\mu,\Sigma}(x_i)^2 = (x_i - \mu)^T \Sigma^{-1} (x_i - \mu)$ where $\mu$ and $\Sigma$ are the location (e.g., mean or median) and the covariance of the underlying Gaussian distribution.

In practice, $\mu$ and $\Sigma$ are replaced by estimates. The usual covariance maximum likelihood estimate is very sensitive to the presence of outliers in the data set; therefore, the corresponding Mahalanobis distances are as well. Consequently, the prediction engine may instead employ a robust estimator of covariance to guarantee that the estimation is resistant to "erroneous" observations in the data set, and that the associated Mahalanobis distances accurately reflect the true organization of the observations.

The Minimum Covariance Determinant (MCD) estimator is a robust, high-breakdown point estimator of covariance (i.e. it can be used to estimate the covariance matrix of highly contaminated datasets, up to $$\frac{n_{samples} - n_{features} - 1}{2}$$

outliers). The idea is to find $$\frac{n_{samples} + n_{features} + 1}{2}$$

observations whose empirical covariance has the smallest determinant, yielding a "pure" subset of observations from which to compute standards estimates of location and covariance.

This example illustrates how the Mahalanobis distances are affected by outlying data: observations drawn from a contaminating distribution are not distinguishable from the observations coming from the real, Gaussian distribution that one may want to employ. Using MCD-based Mahalanobis distances, the two populations become distinguishable.

However, the above approach does not handle bimodal strain distributions well, and thus the prediction engine may supplement by running the same algorithms on the original values and using the combined inlier/outlier information to determine which points are outliers. This affects a very small number of datapoints, but does require a second parameter, and that is the threshold to use for determining beyond which distance a point is considered an outlier when running the algorithm on the values. This second parameter is the value_threshold. To do so, the prediction engine may also employ the actual sample values themselves to determine outliers. In that case, a value_threshold may be employed as the Mahalanobis distance parameter. According to embodiments of the disclosure, the prediction engine may run the outlier detection algorithm using each threshold. Where the algorithm identifies the same outliers using both the values and residuals, they are removed from computing the location for determining the Mahalanobis distance. This updated Mahalanobis distance is used to determine the outliers.

The embodiments of the disclosure for parameter tuning, described below, perform well for simultaneously tuning both parameters. However, to simplify the discussion this disclosure will primarily refer to the residual_threshold or just "parameters" for the more general scenario. Also, the optimizations below apply to tuning any parameters for any unsupervised algorithm where separation of classes of data is valuable in the context of high throughput screening, not just for the outlier detection algorithm described herein. It may further be used to compare unsupervised outlier detection algorithms in this context.

Parameter Tuning

When parameter tuning in the context of supervised data, there are standard, well known metrics for deciding which parameters are performing best for the problem at hand. In the context of tuning parameters for unsupervised data, the fundamental problem is determining a useful metric for deciding between parameter choices.

Figure 3:
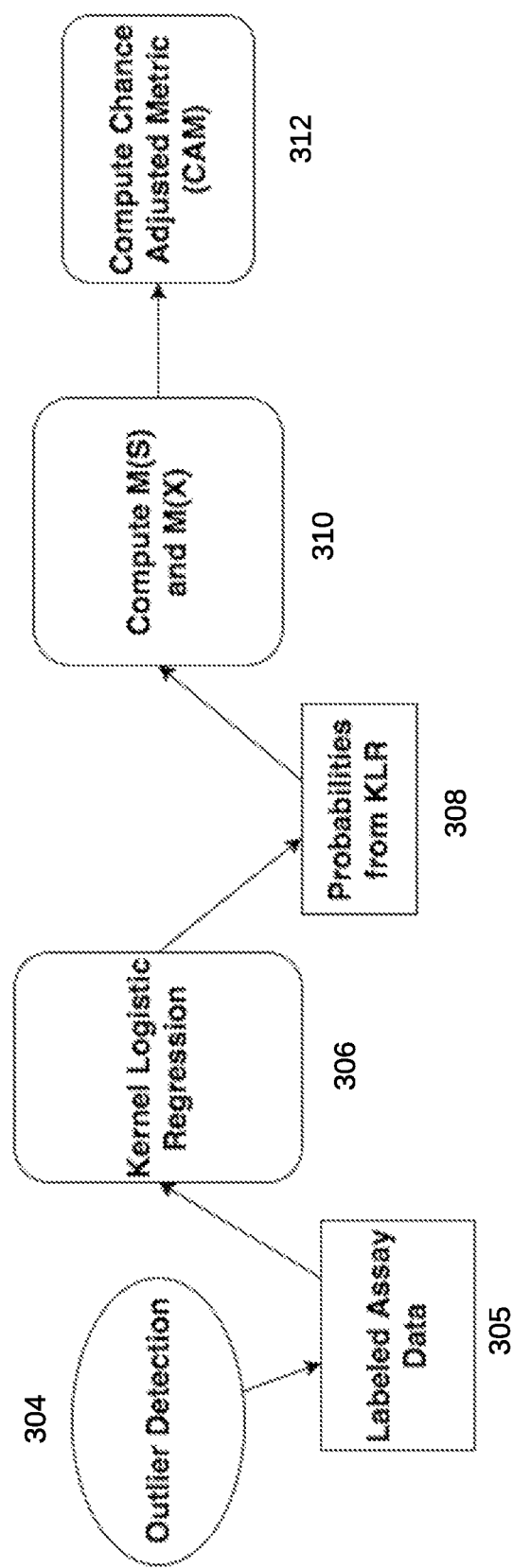
FIG. 3 illustrates an algorithm for computing a metric for parameter tuning, according to embodiments of the disclosure.

FIG. 3 illustrates an algorithm, according to embodiments of the disclosure, for computing a metric for parameter tuning, based on the method proposed by Marques, et. al. FIG. 3 employs an oval to represent an outlier detection algorithm, to separate that logic from the logic for computing the metric used for choosing parameters for that algorithm according to embodiments of the disclosure. This separation illustrates that finding and computing a useful metric for comparing parameter choices/models according to embodiments of the disclosure is agnostic to the underlying outlier algorithm.

Rectangular boxes represent data/labels/information out of a particular process. The rounded corner boxes are models/computations for performing many of the optimizations according to embodiments of the disclosure.

Figure 1A:
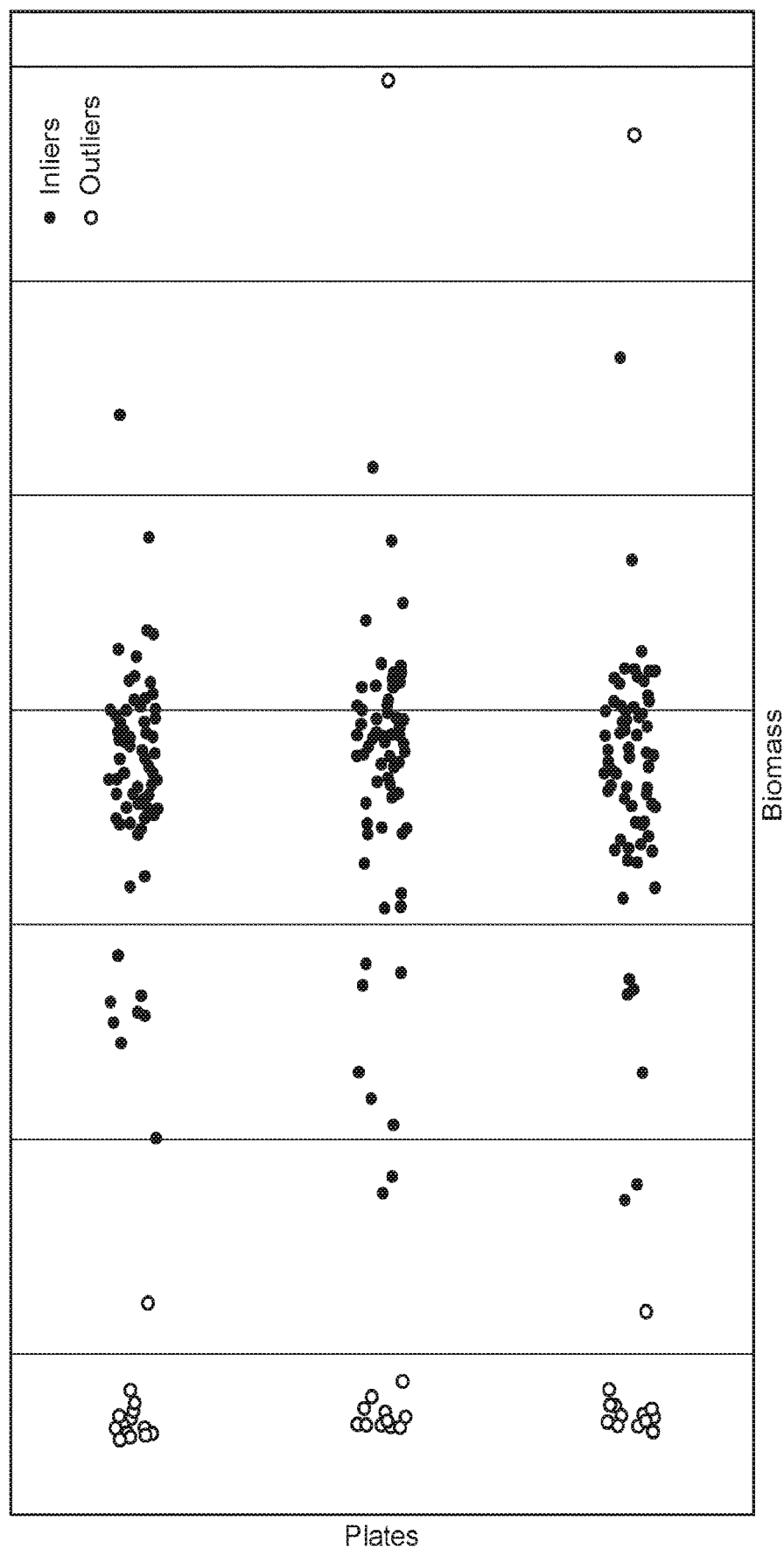
FIG. 1A illustrates biomass measurements for three plates grouped along the y axis, in which each sample point represents measurement of biomass for a single well (holding a single strain replicate) on a plate.
Figure 1B:
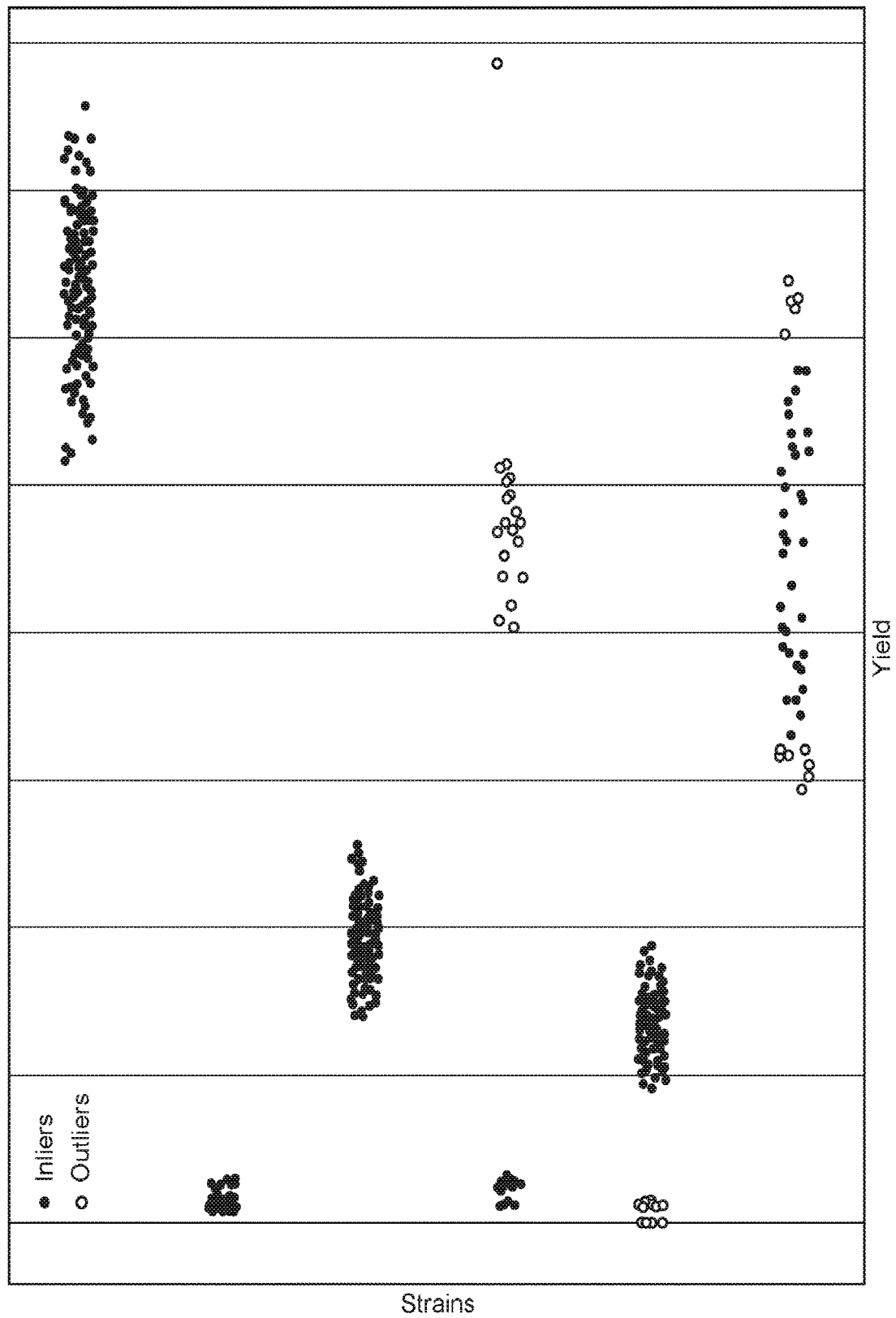
FIG. 1B illustrates titer measurements for six strains grouped along the y axis, in which each sample point represents measurement of titer for a single well on a plate.

According to embodiments of the disclosure, the prediction engine may run an outlier detection algorithm or receive the results of an outlier detection algorithm (304). Based on known observations from experiments, the outlier detection algorithm may be configured to group performance measurements of objects (e.g., strain replicates) to provide a distribution that may be most amenable to division between inliers and outliers. In this example, similar to that of the titer measurements of FIG. 1B, the strain replicate performance measurements may be grouped by strain, and the outlier detection algorithm may be run on all plates for all strains for a single experiment and a single set of parameters at this step, to determine candidate outlier wells (each well holding a strain replicate). The algorithm may employ a minimum covariance determinant and elliptic envelope technique such as that described above.

The outlier detection algorithm produces assay data (305) with the data labeled as inliers or outliers. Let $X = \{x_1, x_2, \ldots, x_N\}$ be the data set in which some points are labeled as outliers. Let $S \subset X$ be the subset of n points in X that are labeled outliers. Let Y be the set of inlier/outlier labels applied to the data in X as assigned by the outlier detection algorithm.

Using the grouping chosen for the outlier detection algorithm, a Kernel Logistic Regression (KLR) algorithm (306) may be trained on the labeled assay data, a distribution of the objects (here, strain replicates) for a single group (e.g., here, a single strain, but could be a single plate or experiment in other embodiments), according to this example. In this example, in which the group is a single strain, the prediction engine employs KLR (306) to generate probabilities (308) indicating for each strain replicate (well) measurement within the group (here, a single strain) the probability that a strain replicate measurement falls within the outlier class. According to embodiments of the disclosure, the KLR algorithm may employ gamma and class weight to refine the probabilities.

KLR determines the probability that a candidate outlier determined by the outlier regression algorithm should actually be classified as an outlier. KLR has a standard loss function (like many statistical models), referred to herein as $\xi(x, y; w)$ where w represents the coefficients in the regression function. In this context, "fitting the model" means finding the values for w that minimize the loss function $\Sigma_{i=1}^{N}\xi(x_i, y_i; w)$. It is common to add an L2 (or L1) penalty to this loss function. In that case, fitting the model becomes finding the coefficients w that minimize $\frac{1}{2}w^T w + C\Sigma_{i=1}^{N}\xi(x_i, y_i; w)$ where C is a scaling parameter, so that for larger C the loss function plays a larger role in determining the classification boundary relative to the regularization, and for smaller C the regularization plays a larger role. Thus, C enables control of the effect of the regularization on the overall loss.

Embodiments of the disclosure enable further control of the loss function using class-weights. Embodiments of the disclosures employ two classes—outlier and inlier. Following Marques, β is used to indicate the weight for an outlier (in two-class classification, the same effect comes from only weighting one class). Then the scaling parameter on the loss function becomes βC when the label $y_i$ indicates an outlier and remains C for inliers. The prediction engine of embodiments of the disclosure follows the Marques philosophy that β should be chosen to reduce the loss of misclassifying an outlier as an inlier relative to misclassifying an inlier as an outlier. However, in practice the inventor has found it best to tune this parameter using the data, as shown in the optimizations below.

The use of the term "kernel" in "kernel logistic regression" refers to applying a transformation to the data prior to fitting that allows use of a linear model on non-linear data. In a classification scenario (e.g., outlier vs. inlier), the decision boundary is non-linear when viewed on the original data, but the decision boundary is linear on the transformed data after applying a kernel. This is particularly useful in the context of outliers where the decision boundary is not expected to be linear, but rather, more likely radial (Gaussian). Embodiments of the disclosure use the radial kernel (one of the most commonly used): $K(x_i, x_j) = e^{-\gamma \|x_i - x_j\|^2}$ where this formulation follows that in scikit-learn.

Thus, according to embodiments of the disclosure, the Kernel Logistic Regression has three parameters "gamma, C, and class-weight" corresponding to γ, C, and β, that appear in the process of computing a metric to use in choosing the parameters for outlier detection. Note that these are not the parameters with which embodiments of the disclosure are primarily concerned with tuning. Instead, embodiments of the disclosure handle these parameters separately, as described immediately below.

4(a) γ: Marques proposes, based on simulation studies, averaging over a range of values for gamma (e.g., 0.01, 0.1, 1, 10, 100, 1000) up to a value of gamma where any point labeled as an outlier is individually discriminated from all the others—e.g. each has its own decision boundary. This is typically not too large, say not more than 1000, but could be easily determined in a semi-supervised way.

4(b) C, β: These are fundamentally related. Marques et al. gives far less guidance on choices for these parameters. Thus, choosing these parameters is the first optimization discussed in the next section.

The implementation of FIG. 3 ultimately computes the Chance Adjusted Metric (CAM). (Embodiments elsewhere in this disclosure employ optimizations to aggregate those metrics into a single useful metric for high throughput screening.)

According to embodiments of the disclosure, to compute the CAM the prediction engine computes the mean probability M(X) for the entire data set over all $\gamma_j$, and the mean probability M(S) for the subset of labeled candidate outliers over all $\gamma_j$ (310). According to embodiments of the disclosure, the prediction engine then computes the chance adjusted metric (312) for the single group (here, strain). Details are provided below.

Let $\gamma_1, \gamma_2, \ldots \gamma_k$ be the discrete set of values of gamma chosen as in 4(a) above. Let $p(x_i, \gamma_j)$ be the probability provided by the KLR for $\gamma_j$.

Set the mean probability for the entire data set (all $x_i$ in X) over all $\gamma_j$ as $$M(X) = \frac{1}{k}\Sigma_{j=1}^{k}\left(\frac{1}{N}\Sigma_{i=1}^{N} p(x_i, \gamma_j)\right) \quad (310)$$

Set the mean probability for the subset of labeled candidate outliers (all $x_i$ in S) over all $\gamma_j$ as $$M(S) = \frac{1}{k}\Sigma_{j=1}^{k}\left(\frac{1}{N}\Sigma_{x_i \in S} p(x_i, \gamma_j)\right). \quad (310)$$

Then $$CAM = \frac{M(S) - M(X)}{1 - M(X)}. \quad (312)$$

Optimizations

Embodiments of the disclosure expand upon the implementation of FIG. 3 with optimizations.

As noted above, embodiments of the disclosure follow Marques and average over multiple values of γ, but the inventor found it advantageous to take a semi-supervised approach to tuning C and the class-weight β. An example of an optimization of embodiments of the disclosure is to take one strain or plate (more generally, an "object" at a level of granularity) from one experiment and check values until a plot of the chance adjusted metric shows the shape it should have as the parameters for the outlier algorithm vary—the metric should initially increase as the parameter (e.g., the residual threshold) increases and then decrease slightly or level off (as eventually the outlier detection is classifying all points as inliers) as the parameter continues to increase.

Figure 4:
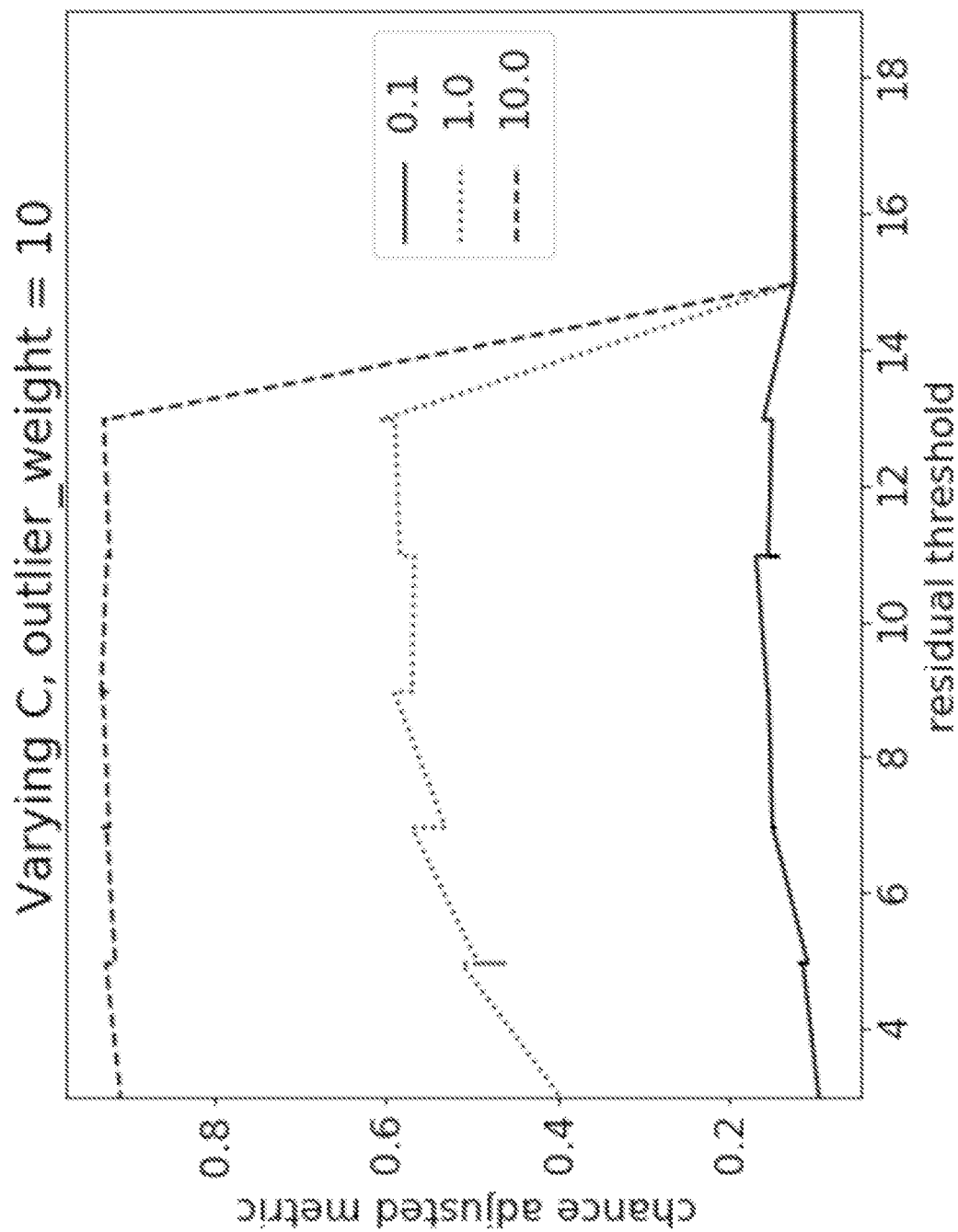
FIG. 4 depicts a graph of chance adjusted metric vs. residual threshold based on a modified version of the flow of FIG. 3, according to embodiments of the disclosure.

For example, FIG. 4 depicts a plot of CAM vs. residual threshold based on a modified version of the flow of FIG. 3, in which a single biomass assay is performed. In this example, outlier detection was run for a single assay for a single experiment. KLR was performed as a one-time process for a single experiment on a single plate (i.e., plate level of granularity). In this example, the prediction engine analyzed a small range of values of C used in Marques (which is the inverse of the C used in scikit learn), assuming a fixed value for the inlier weight and a range of values for the outlier weight.

Figure 5:
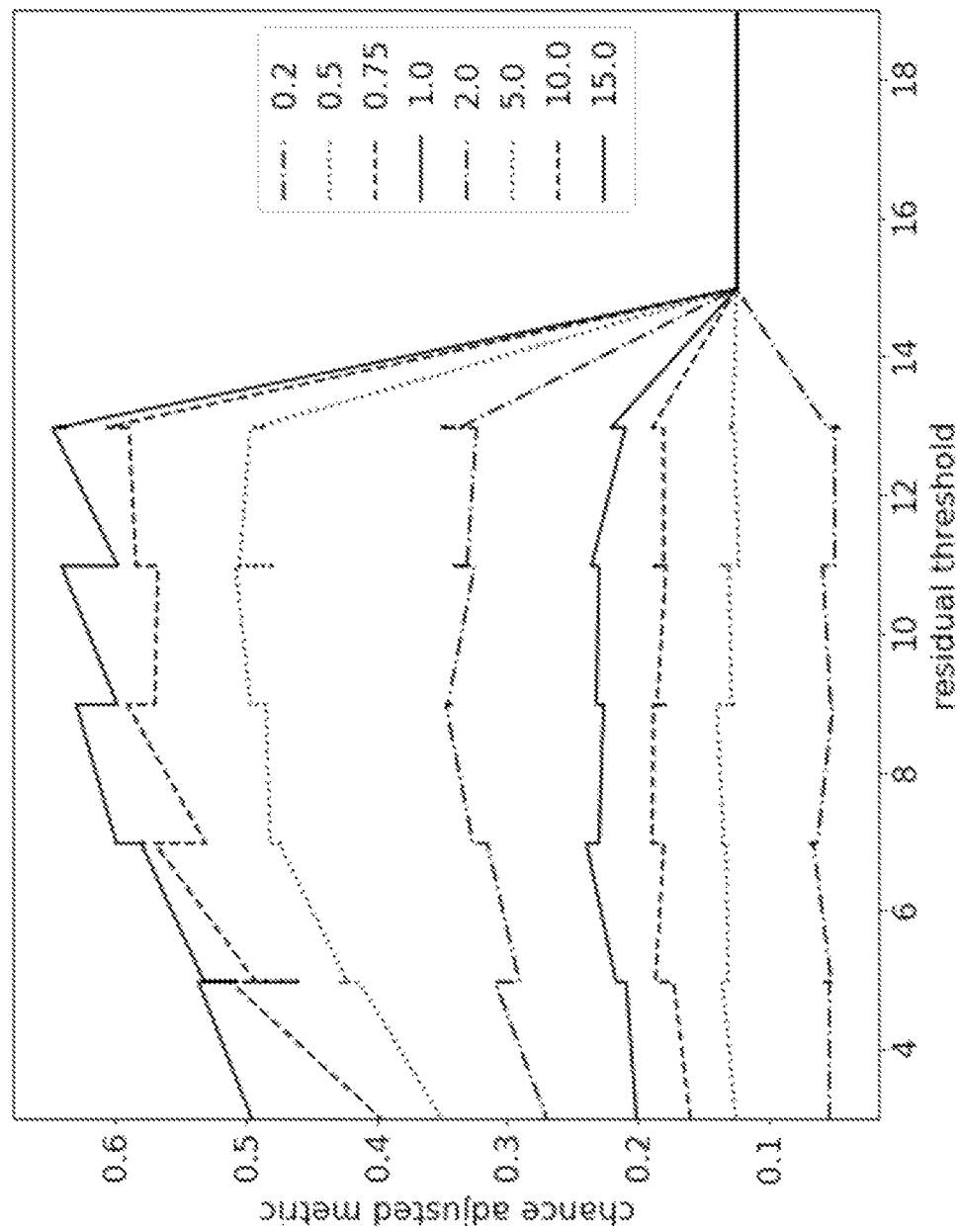
FIG. 5 depicts a graph of chance adjusted metric vs. residual threshold for different outlier weights, according to embodiments of the disclosure.

FIG. 4 illustrates the effect for three different values of C (0.1, 1.0 and 10.0, as shown in the legend to the right of the graph), for a single outlier weight (e.g., 10). As the residual threshold increases, it is expected that the algorithm will designate fewer and fewer values as outliers until it identifies all points as inliers and the metric becomes zero. Once the residual threshold is large enough to designate all values as inliers that stays the case for all larger values. Therefore it is expected that the metric will slowly increase and then decrease until the drop to 0. In the graph, the different scales for the metrics makes some of them appear quite flat, but note that when C=1 the expected behavior is more clearly exhibited, so the prediction engine may set that value of C and then explore a range of values (e.g., 0.2-15.0) for the outlier weight, as shown in FIG. 5.

Figure 6A:
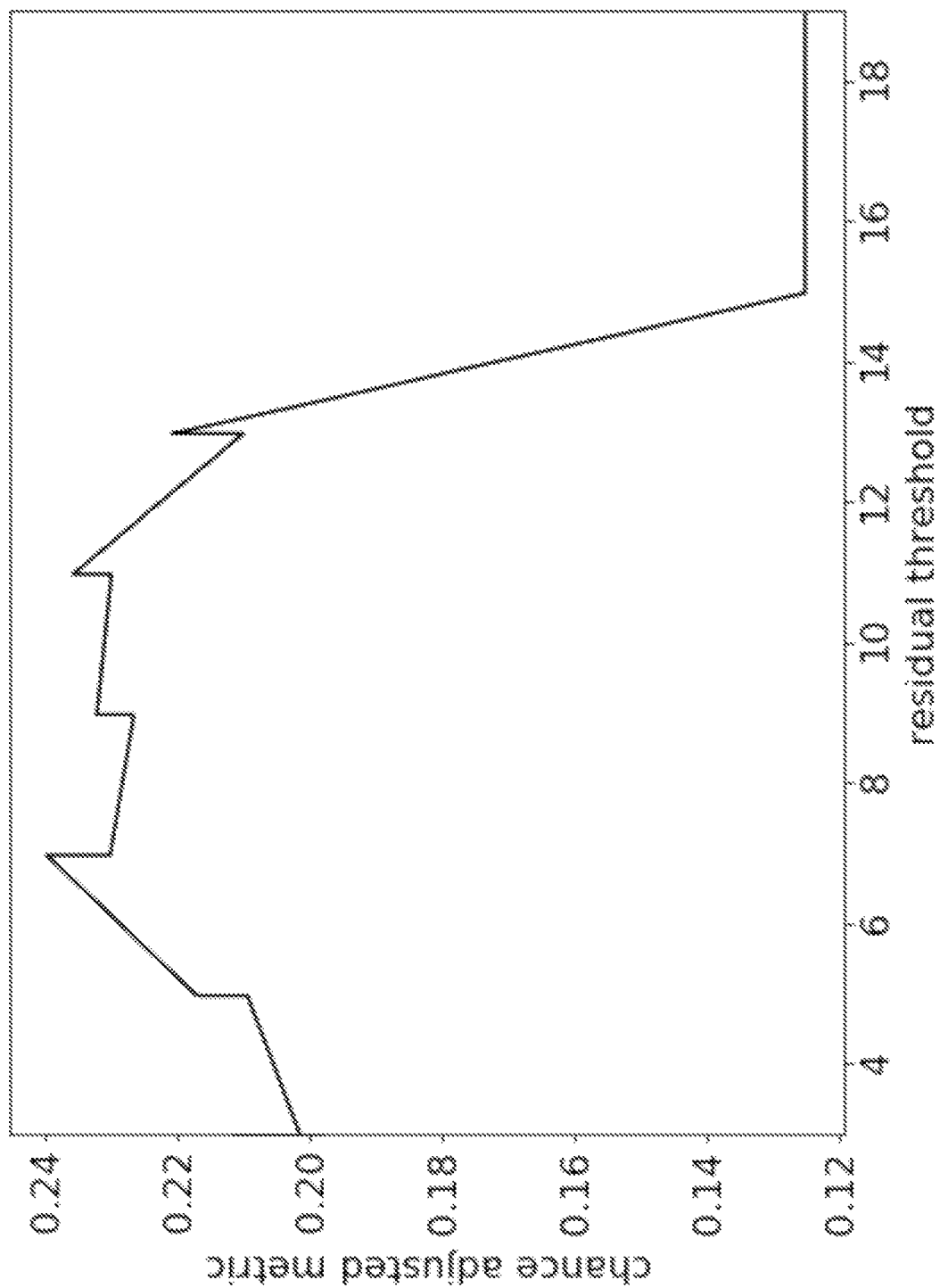
FIGS. 6A and 6B depict individual plots of chance adjusted metric vs. residual threshold, each for a different outlier weight, according to embodiments of the disclosure.
Figure 6B:
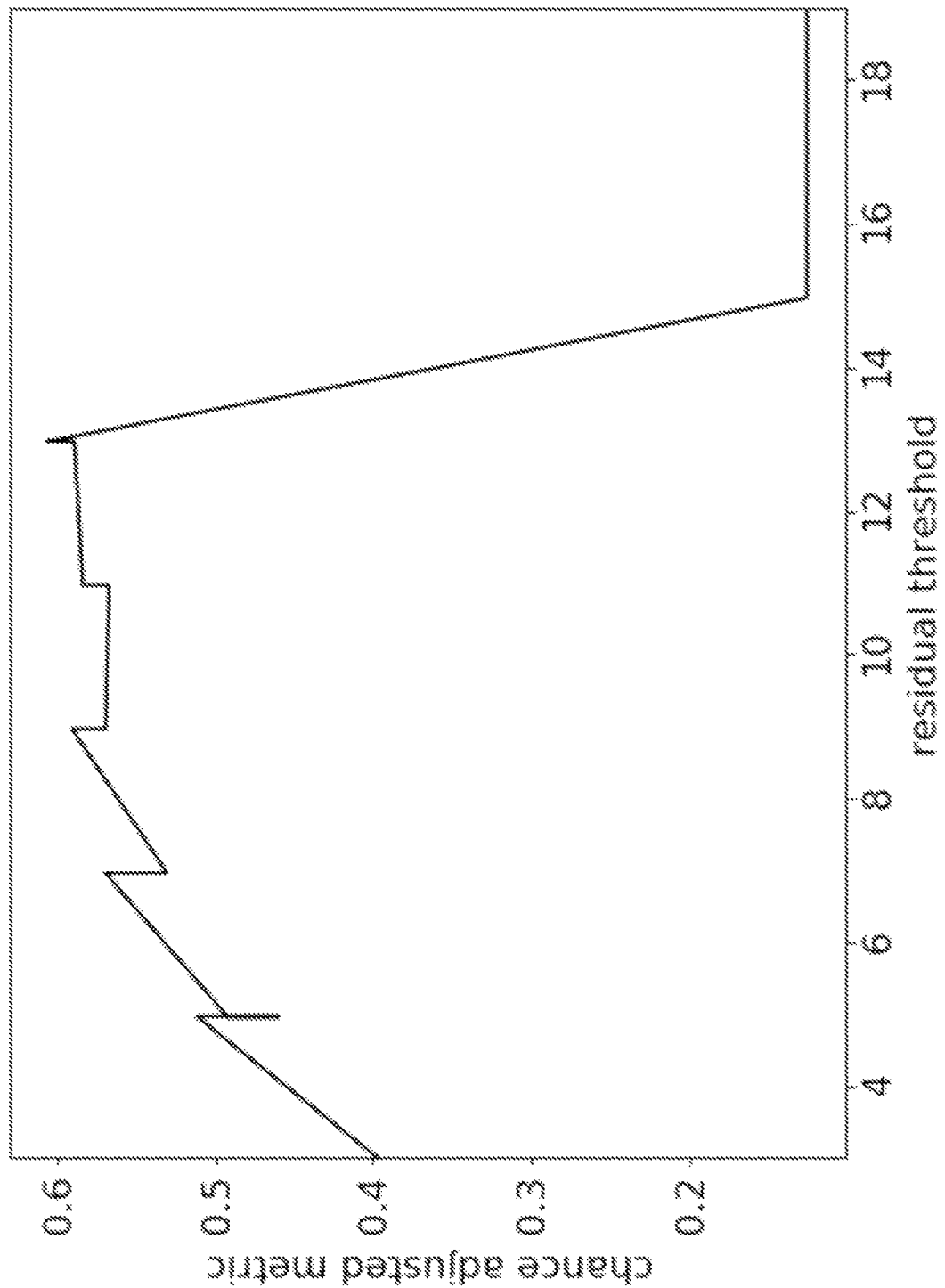

It appears that when the outlier weight (shown in the legend to the right of the graph of FIG. 5) is 10 or 15, the metric curve looks as expected. Again, the scale appears that it could be deceptive. Thus, the inventor examined individual graphs of outlier weight=10 and 1 to check this idea where outlier weight=1 in FIG. 6A and 10 in FIG. 6B.

The figures show approximately similar behavior, but on very different scales. As an example, embodiments of the disclosure proceed with the value in FIG. 6B, setting C=1 and outlier weight=10 in following description.

Kernel Logistic Regression requires multivariate data. However, often the sample data set is univariate, and it is desired that the metric and parameter tuning of the outlier detection algorithm work equally well for both univariate and multivariate data. Accordingly, embodiments of the disclosure may "jitter" the univariate data. According to embodiments, the prediction engine may implement a modified version of KLR 306 to add jitter for univariate data. The prediction engine may implement two optimizations for jitter. One is a random jitter, taking a random sample of values from a uniform distribution over [0,1] as the second variable. The prediction engine also may have access to yield data and biomass data (for example). The prediction engine may use the biomass data as the second "jitter" variable when identifying outliers in the yield data. This works well as the biomass data is on a good scale for "jittering" the yield data. When other assays on the right scale are available, the prediction engine may use those as well.

Figure 7:
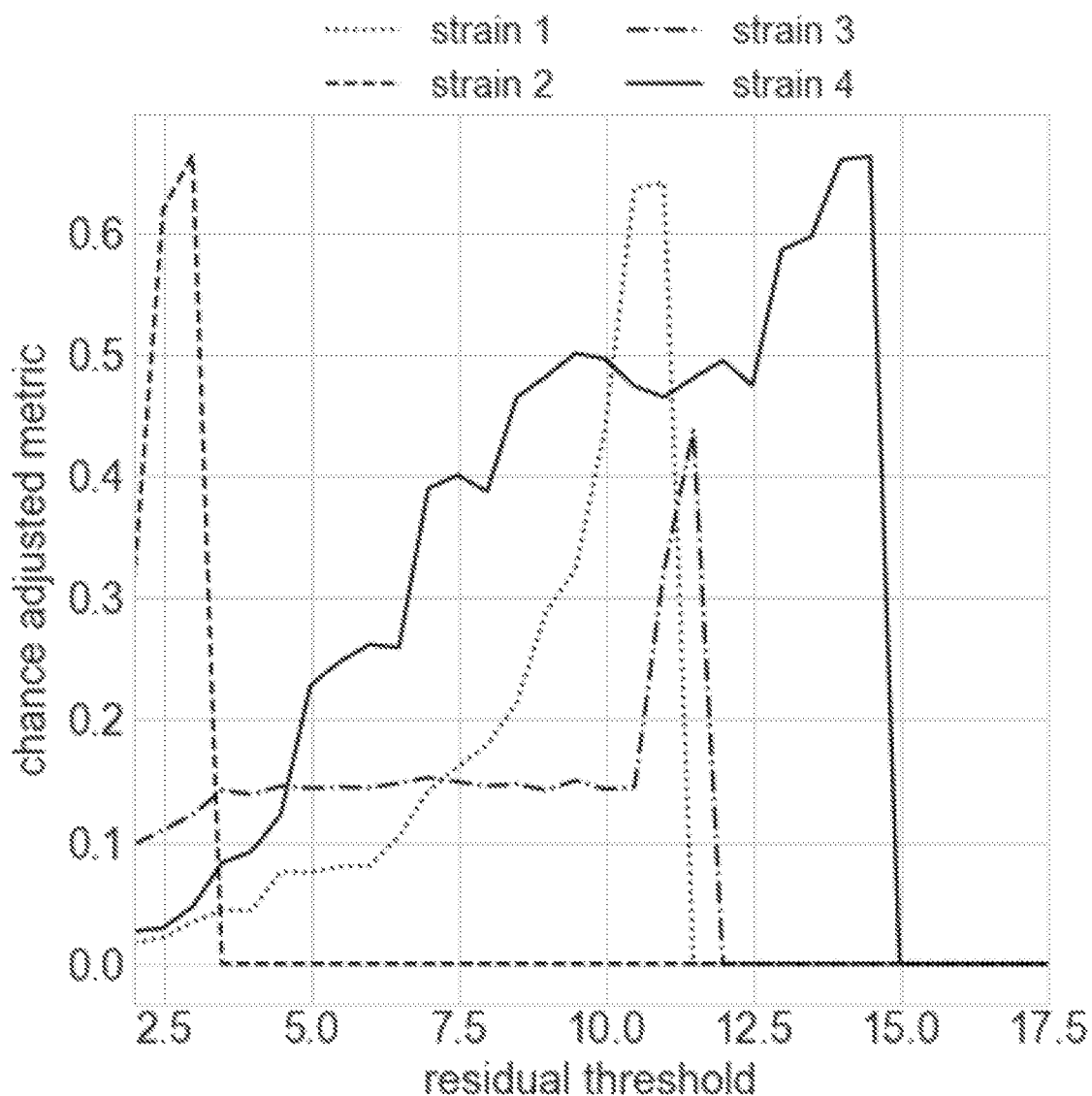
FIG. 7 illustrates chance adjusted metric vs. residual threshold plots for a single experiment (a single assay at a single point in time), with the outlier detection algorithm run over a range of residual thresholds and the per-strain metric computed for each of those runs, according to embodiments of the disclosure.

A third set of optimizations benefits from adding detail to some of the background discussion. The outlier detection algorithm of embodiments of the disclosure employs a residual threshold as a parameter. FIG. 7 shows the results of a single experiment (a single assay at a single point in time), with the outlier detection algorithm run over a range of residual-thresholds (the parameter of interest, in the example) and the per-strain metric computed for each of those runs. The residual-threshold value that corresponds to the largest metric value is the one where the outlier detection performed the best at separating outliers from inliers for that strain.

However, this gives rise to a technical problem. As part of training the algorithm, it would defeat the purpose of training if the residual threshold had to be tuned for each experiment, and even worse if it had to be tuned for each strain. Doing so would render the outlier detection algorithm ineffective. As a solution to this problem, embodiments of the disclosure aggregate metrics at a very fine level to produce a single metric that is used to find the value of the threshold that is "best" for all the strains, and then further aggregate to find the value that is "best" for all the strains over time.

Figure 8:
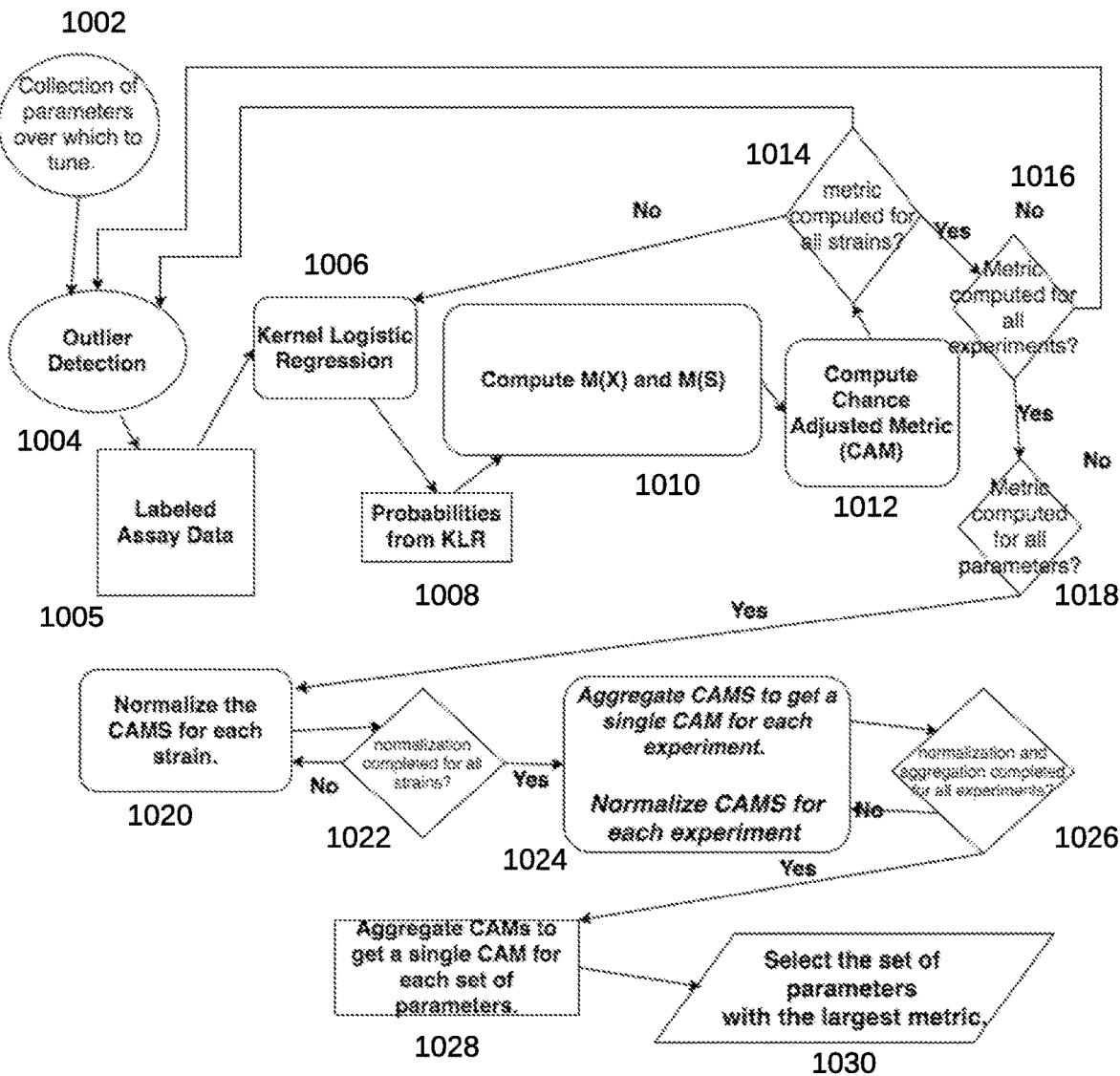
FIG. 8 illustrates a modification of the algorithm of FIG. 3 that includes iterations and aggregation processes, according to embodiments of the disclosure.

FIG. 8 is a modification of the algorithm of FIG. 3 and includes iterations and aggregation processes, according to embodiments of the disclosure.

According to embodiments of the disclosure, a user selects a collection of parameters (e.g., residual threshold run from 0-20 in increments of ½, value threshold run from 0-10 in increments of ½) over which to tune (1002). The prediction engine will iterate over the selected set. In embodiments, a user may perform a brute-force grid search over this selected collection of parameters. Such a grid search is embarrassingly parallelizable and a user may parallelize this search. In embodiments, a user may alternatively select the collection of parameters (1002) using black box optimization which lies in several scholarly fields, including Bayesian Optimization [Bergstra et. al., Shahriari et. al., Snoek et. al.], Derivative-free optimization [Conn et. al., Rios and Sahinidis], Sequential Experimental Design [Chernoff], and assorted variants of the multi-armed bandit problem [Ginebra and Clayton, Lisha et. al., Srinivas et. al.], all of the foregoing references recited for such fields being incorporated by reference in their entirety herein. These lists are representative, not exhaustive as these are active fields of research. Golovin et. al. has an overview of these techniques.

The prediction engine may run an outlier detection algorithm or receive the results of an outlier detection algorithm (1004). The outlier detection algorithm produces assay data 1005 with the data labeled as inliers or outliers. Based on known observations from experiments, the outlier detection algorithm may be configured to group performance measurements of objects (e.g., strain replicates) to provide a distribution that may be most amenable to division between inliers and outliers. In this example, similar to that of the titer measurements of FIG. 1B, the strain replicate performance measurements are grouped by strain, and the outlier detection algorithm is run on all plates for all strains for a single experiment and a single set of parameters at this step, to determine the outlier wells (each well holding a strain replicate). The algorithm may employ a minimum covariance determinant and elliptic envelope technique such as that described above.

Using the grouping chosen for the outlier detection algorithm, the KLR algorithm may be trained on the distribution of the objects (here, strain replicates) for a single group (e.g., here, a single strain, but could be a single plate or experiment in other embodiments), according to this example. In this example, in which the group is a single strain, the prediction engine employs KLR (1006) to generate probabilities (1008) indicating for each strain replicate (well) measurement within the group (here, a single strain) the probability that a strain replicate measurement falls within the outlier class. According to embodiments of the disclosure, the KLR algorithm may employ gamma and class weight to refine the probabilities, as discussed above.

According to embodiments of the disclosure, the prediction engine computes the mean probability M(X) for the entire data set over all $\gamma_j$, and the mean probability M(S) for the subset of labeled candidate outliers over all $\gamma_j$ (1010), as described above.

According to embodiments of the disclosure, the prediction engine then computes the chance adjusted metric (1012) for the single group (here, strain).

According to embodiments of the disclosure, the prediction engine then iterates to return to perform KLR (1006) for another group (here, another strain) within the grouping and to continue to compute the chance adjusted metric for all groups (here, all strains) (1014). Note that the full grouping of strains may reside on one or more plates, so KLR may be run on strains on multiple plates.

After completing those iterations, the prediction engine then determines whether the CAM has been computed for all experiments (1016). If not, then the prediction engine iterates to return to perform, or acquire the results of, outlier detection (1004) for another experiment, and continues through the steps to compute the CAM for all experiments, according to embodiments of the disclosure.

After completing those iterations, the prediction engine then determines whether the CAM has been computed for all parameters (e.g., residual threshold, value threshold) (1018).

If not, then the prediction engine iterates to return to perform, or acquire the results of, outlier detection (1004) for another set of parameters, and continues through the steps to compute the CAM for all sets of parameters, according to embodiments of the disclosure.

The description above of FIG. 8 illustrates obtaining the CAM at a very fine level within each iteration at which the metric becomes more tractable (e.g. single strain, in a single experiment, for a single assay at a single time). FIG. 8 then illustrates aggregating metrics into a single metric used for determining which parameters to use for the outlier detection (e.g., residual_threshold and value_threshold). Below is further detail on the aggregation process according to embodiments of the disclosure.

Aggregation

At the same level of grouping as above (in this example, strain), the prediction engine groups the CAMs by group (here, strain) to provide metrics for each set of parameters. This represents a distribution of the CAM for each group sampled at different parameters. Let $m_1, m_2, \ldots, m_t$ be the CAM metrics in this distribution, i.e., $m_i$ is a single CAM for each set of one or more parameters (e.g., each set of (residual threshold, value threshold) pairs).

For each distribution of those CAMs, the prediction engine normalizes the CAMs for each group (here, strain) by computing $m_i - \mu$ where $$\mu = \frac{1}{t}\Sigma_{i=1}^{t} m_i$$

(the average of the $m_i$ across the sets of parameters), which normalizes the distribution to have a zero mean across the parameters (1020). In embodiments, normalization also includes scaling the CAM distributions by their standard deviations, so they all have mean 0 and standard deviation of 1, to support the assumption of variance being the same for the metric distributions across strains and time.

According to embodiments of the disclosure, the prediction engine then iterates the normalization for all objects within the group (here, all strains) (1022). The resulting data comprises normalized CAM distributions for all strains for all plates and for all experiments across the parameters (e.g., indexed by strain, plate, experiment and parameter).

According to embodiments of the disclosure, the prediction engine then aggregates (e.g., averages) those linearly shifted, normalized CAMs across the levels of granularity at levels finer than the experiment level (e.g., across strains and plates in this example) to obtain a single CAM for each experiment, also indexed by parameter. (According to embodiments, the prediction engine may normalize and aggregate at each level of granularity.) The prediction engine may then normalize the CAMs for the experiment (1024), and repeat the normalization for each experiment in the set of all experiments (1026). The result is an aggregate CAM for each experiment for each set of parameters.

According to embodiments of the disclosure, the prediction engine aggregates the resulting aggregate CAMs across experiments to obtain a single aggregate CAM for each set of parameters (1028).

According to embodiments of the disclosure, the prediction engine then selects the set of parameters for the largest aggregate CAM (1030). The selected set of parameters is the optimal set for the outlier detection algorithm.

Embodiments of the disclosure may select the best outlier detection algorithm from a set of algorithms. To do so, the prediction engine may include another iterative loop (not shown) in the diagram of FIG. 8 to run different outlier detection algorithms, and include the results stemming from each algorithm in aggregation of the CAM. In such embodiments, the prediction engine may run each outlier detection algorithm (1002), identify the best parameters (e.g., threshold parameters) for each such algorithm, and use the best (e.g., largest) CAMs to identify the best outlier detection algorithm.

Figure 9:
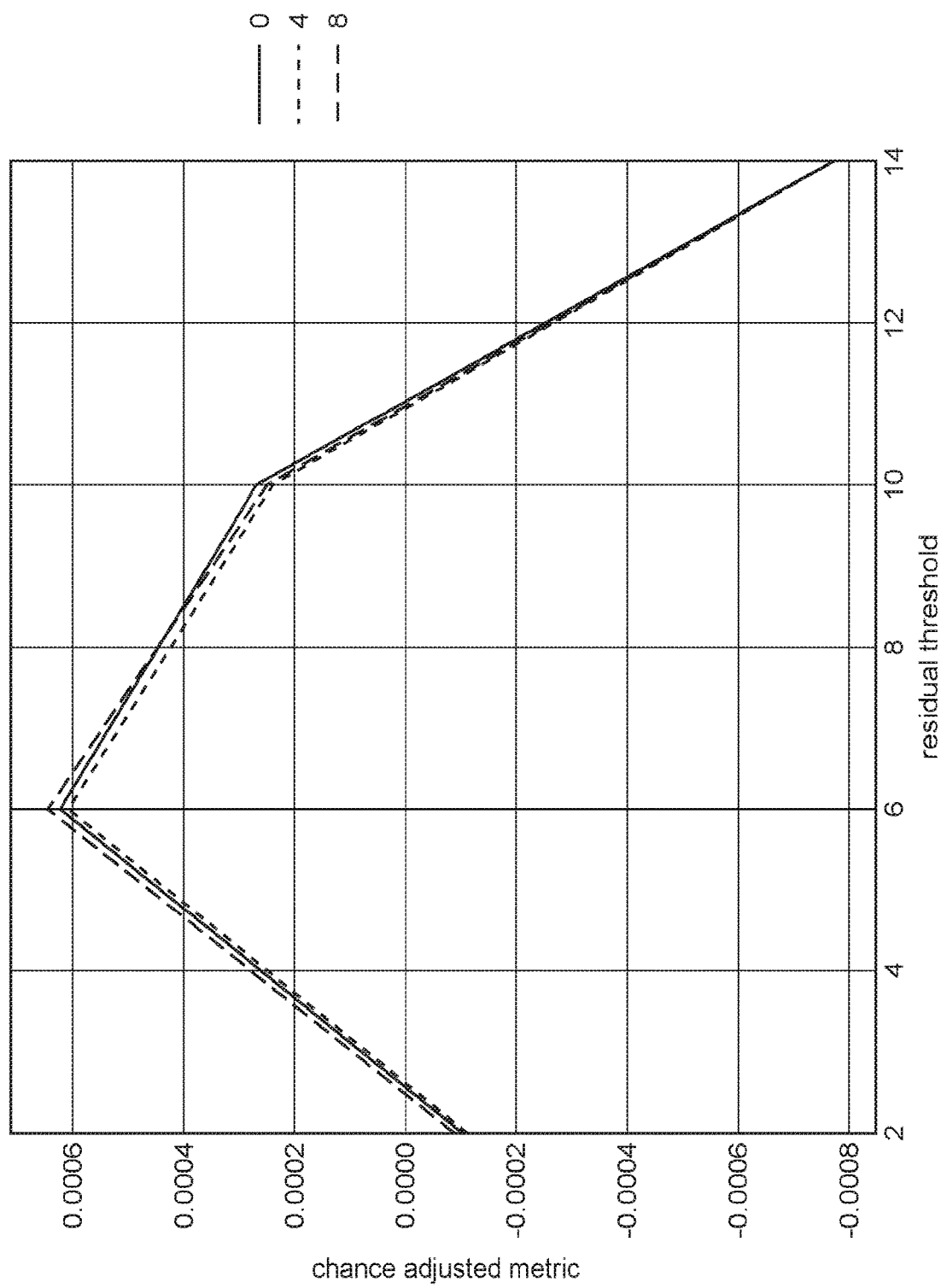
FIG. 9 illustrates chance adjusted metric vs. residual threshold plots for different initial threshold settings, according to embodiments of the disclosure.

A further optimization is around time. Running kernel logistic regression many times can be slow. Thus, in embodiments of the disclosure, the prediction engine may, for example, initially set the residual thresholds to (2, 6, 10, 14), and value thresholds (0, 4, 8) to obtain the results of FIG. 9, in which the legend on the right of the plot represents different initial value threshold settings.

Based upon the inventor's experience, the inventor assumes that the variation of these many distributions are approximately the same. This makes the many distributions comparable, and thus standard aggregation techniques (like the mean) may be used to aggregate the metrics across strains and points in time into a single metric per parameter. Embodiments of the disclosure use the mean.

Experiments show that the value threshold has little impact in this example (but by definition, it should be positive), and that the residual threshold for these data should be approximately 6, and that the metric near 6 may be much better than at 6. Thus, the inventor reran this process using the parameters: residual thresholds (4, 5, 6, 7, 8, 9, 10) and value thresholds (4, 6) where the value thresholds were chosen to confirm that in this example, it has low impact. Using those results, the inventor then ran the experiment again with the scale at 0.5. Using the results under those conditions, one can continue to refine the conditions. Embodiments of the disclosure employ a scale of 0.5.

EXPERIMENTAL EXAMPLES

We give two examples in this section. The first uses outlier detection on two different assays treated as univariate data. It illustrates using the embodiments of the disclosure to choose an algorithm for outlier detection, and that using outlier detection improves the predictive capability for choosing strains for production. The second illustrates using the embodiments of the disclosure to tune one particular outlier detection multivariate algorithm, which improves predictive capability.

We used four outlier detection algorithms provided in *Scikit-learn: Machine Learning in Python*, Pedregosa et al., JMLR 12, pp. 2825-2830, 2011, *API design for machine learning software: experiences from the scikit-learn project*, Buitinck et al., 2013, scikit-learn v0.19.1: Local Outlier Factor (LOF), Elliptic Envelope (EE), Isolation Forest (IF), and One-Class SVM (SVM). This example illustrates choosing between these algorithms, so we use standard values for the hyperparameters for these algorithms.

For LOF, EE and IF we set contamination=0.04 because our data typically has roughly 3-5% of data as outliers. Embodiments of this disclosure may be used to tune this parameter. Further for LOF we used n_neighbors=35, and for EE we set max_samples=the number of rows in the data set. For SVM we used a radial kernel (rbf), nu=0.95*0.04+0.05, and gamma=0 and embodiments of this disclosure may be used to tune these as well. We tested all four algorithms on two different well-level measurements used in a linear model to predict organism performance to select organisms for production. Two linear models were trained: (1) on raw data, and (2) on data to which outlier detection was applied. In the second case, the algorithm with the largest CAM was used. To compare the models, we used a percent error metric for test data (data not used to train the models).

For one measurement for the second case, the embodiments of the disclosure give the following CAMs:

| Outlier Algorithm | CAM |
|---|---|
| IF | 0.011609 |
| EE | 0.010588 |
| SVM | 0.007929 |
| LOF | −0.030126 |

For the second measurement for the second case, the embodiments of the disclosure give the following CAMs

| Outlier Algorithm | CAM |
|---|---|
| LOF | 0.100256 |
| IF | 0.007102 |
| EE | −0.014298 |
| SVM | −0.093060 |

We fit a standard linear model of the form production_metric=a+b_1*measurement_1+b_2*measurement_2, and obtained a 39.7% error (RMSE/mean of true production metric) for the first case, and only 38.8% error for the second case.

According to the embodiments of the disclosure, outlier detection may be run on the measurements separately as in Example 1 above, or together (multivariate) as in a second example. As in Example 1, for Example 2 two linear models were trained: (1) on raw data, and (2) on data to which outlier detection was applied. In the second case, the parameters with the largest CAM were used. To compare the models, we used a percent error metric for test data (data not used to train the models).

Figure 12:
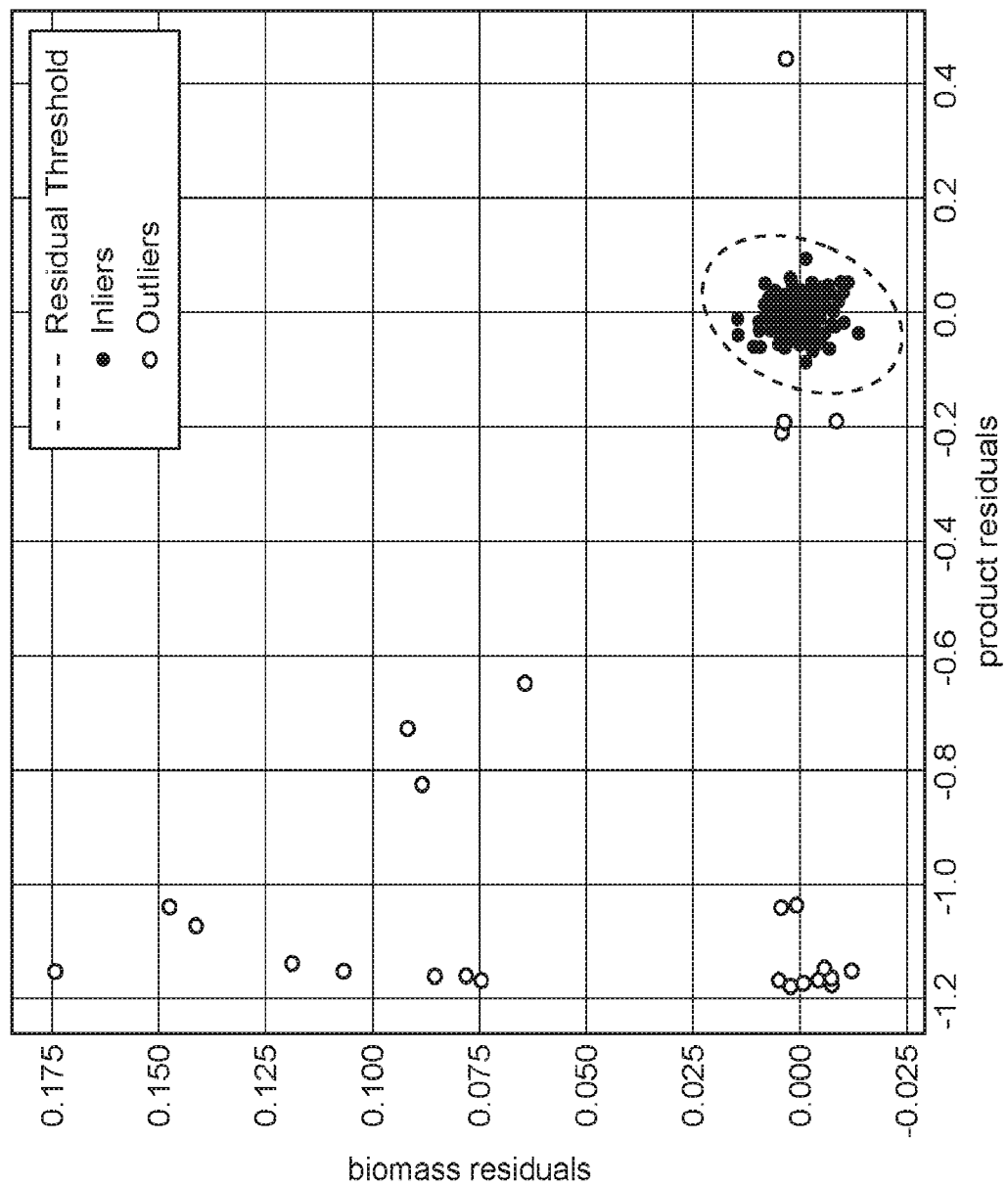
FIG. 12 illustrates experimental inlier and outlier data, according embodiments of the disclosure

The collection of parameters used (1002) were residual thresholds from 3 to 11.5 in increments of ½, and value thresholds from 1-7 in increments of 1. The largest CAM was 0.02199 and the corresponding parameters were residual threshold=4 and value threshold=5. In the first case, where no outlier detection was used, the percent error is 26.4% and in the second case the error is 17.4%. We illustrated three plates worth of data in FIG. 12. FIG. 12 illustrates the inliers and outliers along with the residual threshold for this example.

Embodiments of the disclosure may implement other optimizations.

At the scale of strains, the inventor expects that some strains will have measurements for which there are no outliers, and some where all the measurements are determined to be outliers. According to embodiments of the disclosure, computation of the chance adjusted metric handles those cases correctly. Kernel logistic regression would not appear necessary in these cases, but probabilities and a metric are still needed. If all measurements are identified as inliers then the probability they are outliers is 0, and if all measurements are identified as outliers then the probability they are inliers is 1. With respect to the chance adjusted metric, the first case (no outliers) makes the metric 0 and in the second case (all outliers) the metric is not defined. Because the prediction engine may aggregate across these metrics, it may set the metric to a number such as ⅛ (any small positive fraction would work well both mathematically and in practice) for the case when all measurements are marked as inliers, and set the metric to be −1 when all measurements are marked as outliers (in order to penalize that labeling all points as outliers, but not too much relative to other labels). These could be further tuned using the data.

Machine Learning

Embodiments of the disclosure may apply machine learning ("ML") techniques to learn the relationship between the given parameters (features) and observed outcomes (e.g., determination of outlier status). In this framework, embodiments may use standard ML models, e.g. Decision Trees, to determine feature importance. In general, machine learning may be described as the optimization of performance criteria, e.g., parameters, techniques or other features, in the performance of an informational task (such as classification or regression) using a limited number of examples of labeled data, and then performing the same task on unknown data. In supervised machine learning such as an approach employing linear regression, the machine (e.g., a computing device) learns, for example, by identifying patterns, categories, statistical relationships, or other attributes exhibited by training data. The result of the learning is then used to predict whether new data will exhibit the same patterns, categories, statistical relationships or other attributes.

Embodiments of this disclosure employ unsupervised machine learning. Alternatively, some embodiments may employ semi-supervised machine learning, using a small amount of labeled data and a large amount of unlabeled data for the purpose of assigning probabilities to the data labeled outliers and inliers by the outlier algorithm (e.g. use methods other than the KLR). Embodiments of the disclosure may employ other ML algorithms for learning the parameters of the KLR or for the outlier detection itself. Embodiments may also employ feature selection to select the subset of the most relevant features to optimize performance of the machine learning model. Depending upon the type of machine learning approach selected, as alternatives or in addition to linear regression, embodiments may employ for example, logistic regression, neural networks, support vector machines (SVMs), decision trees, hidden Markov models, Bayesian networks, Gram Schmidt, reinforcement-based learning, cluster-based learning including hierarchical clustering, genetic algorithms, and any other suitable learning machines known in the art. In particular, embodiments employ logistic regression to provide probabilities of classification along with the classifications themselves. See, e.g., Shevade, A simple and efficient algorithm for gene selection using sparse logistic regression, Bioinformatics, Vol. 19, No. 17 2003, pp. 2246-2253, Leng, et al., Classification using functional data analysis for temporal gene expression data, Bioinformatics, Vol. 22, No. 1, Oxford University Press (2006), pp. 68-76, all of which are incorporated by reference in their entirety herein.

Embodiments may employ graphics processing unit (GPU) accelerated architectures that have found increasing popularity in performing machine learning tasks, particularly in the form known as deep neural networks (DNN). Embodiments of the disclosure may employ GPU-based machine learning, such as that described in GPU-Based Deep Learning Inference: A Performance and Power Analysis, NVidia Whitepaper, November 2015, Dahl, et al., Multi-task Neural Networks for QSAR Predictions, Dept. of Computer Science, Univ. of Toronto, June 2014 (arXiv: 1406.1231 [stat.ML]), all of which are incorporated by reference in their entirety herein. Machine learning techniques applicable to embodiments of the disclosure may also be found in, among other references, Libbrecht, et al., Machine learning applications in genetics and genomics, Nature Reviews: Genetics, Vol. 16, June 2015, Kashyap, et al., Big Data Analytics in Bioinformatics: A Machine Learning Perspective, Journal of Latex Class Files, Vol. 13, No. 9, September 2014, Prompramote, et al., Machine Learning in Bioinformatics, Chapter 5 of Bioinformatics Technologies, pp. 117-153, Springer Berlin Heidelberg 2005, all of which are incorporated by reference in their entirety herein.

Computing Environment

Figure 10:
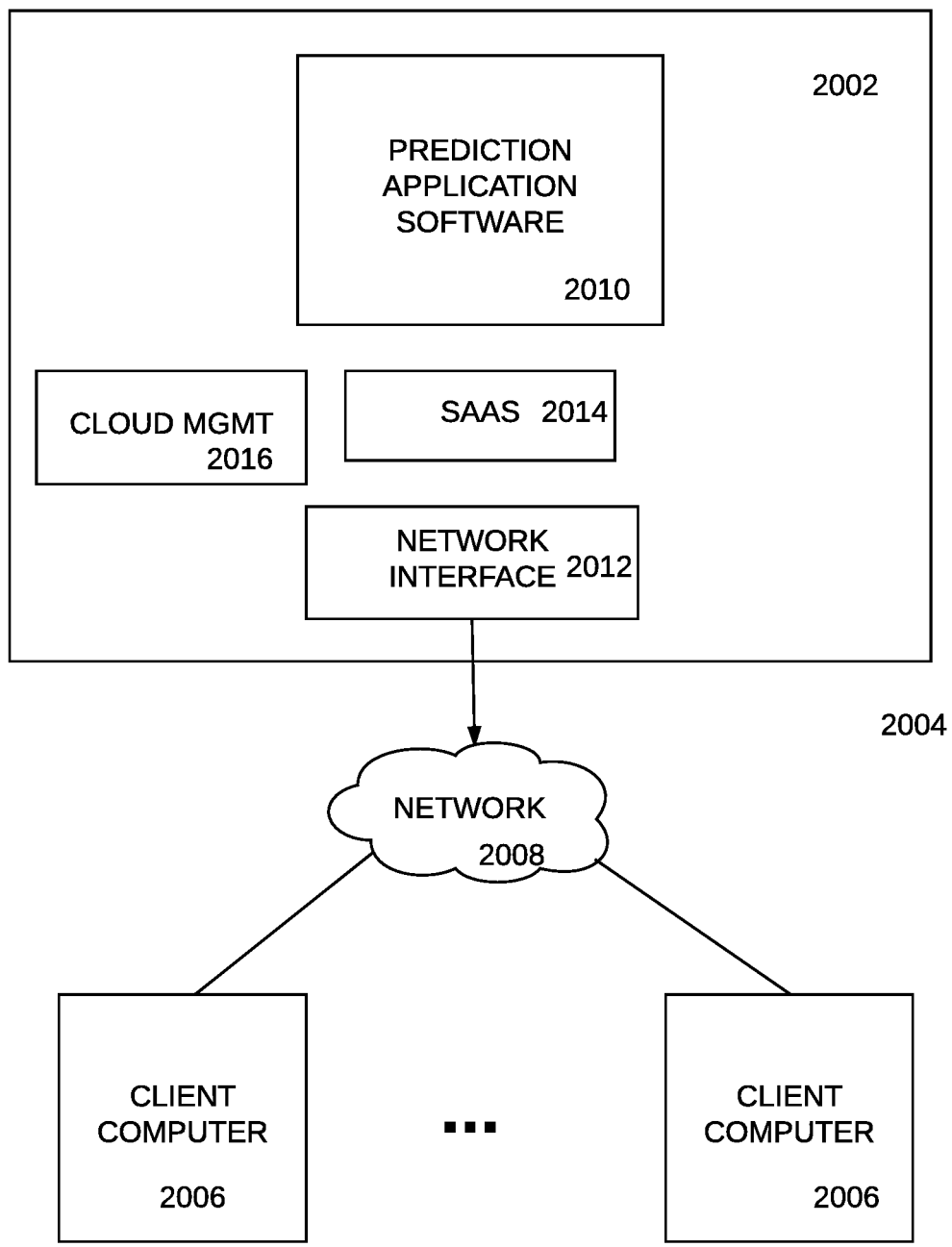
FIG. 10 illustrates a cloud computing environment according to embodiments of the disclosure.

FIG. 10 illustrates a cloud computing environment according to embodiments of the present disclosure. In embodiments of the disclosure, the prediction engine software 2010 may be implemented in a cloud computing system 2002, to enable multiple users to implement the embodiments of the present disclosure. Client computers 2006, such as those illustrated in FIG. 11, access the system via a network 2008, such as the Internet. The system may employ one or more computing systems using one or more processors, of the type illustrated in FIG. 11. The cloud computing system itself includes a network interface 2012 to interface the software 2010 to the client computers 2006 via the network 2008. The network interface 2012 may include an application programming interface (API) to enable client applications at the client computers 2006 to access the system software 2010. In particular, through the API, client computers 2006 may access the prediction engine.

A software as a service (SaaS) software module 2014 offers the system software 2010 as a service to the client computers 2006. A cloud management module 2016 manages access to the software 2010 by the client computers 2006. The cloud management module 2016 may enable a cloud architecture that employs multitenant applications, virtualization or other architectures known in the art to serve multiple users.

Figure 11:
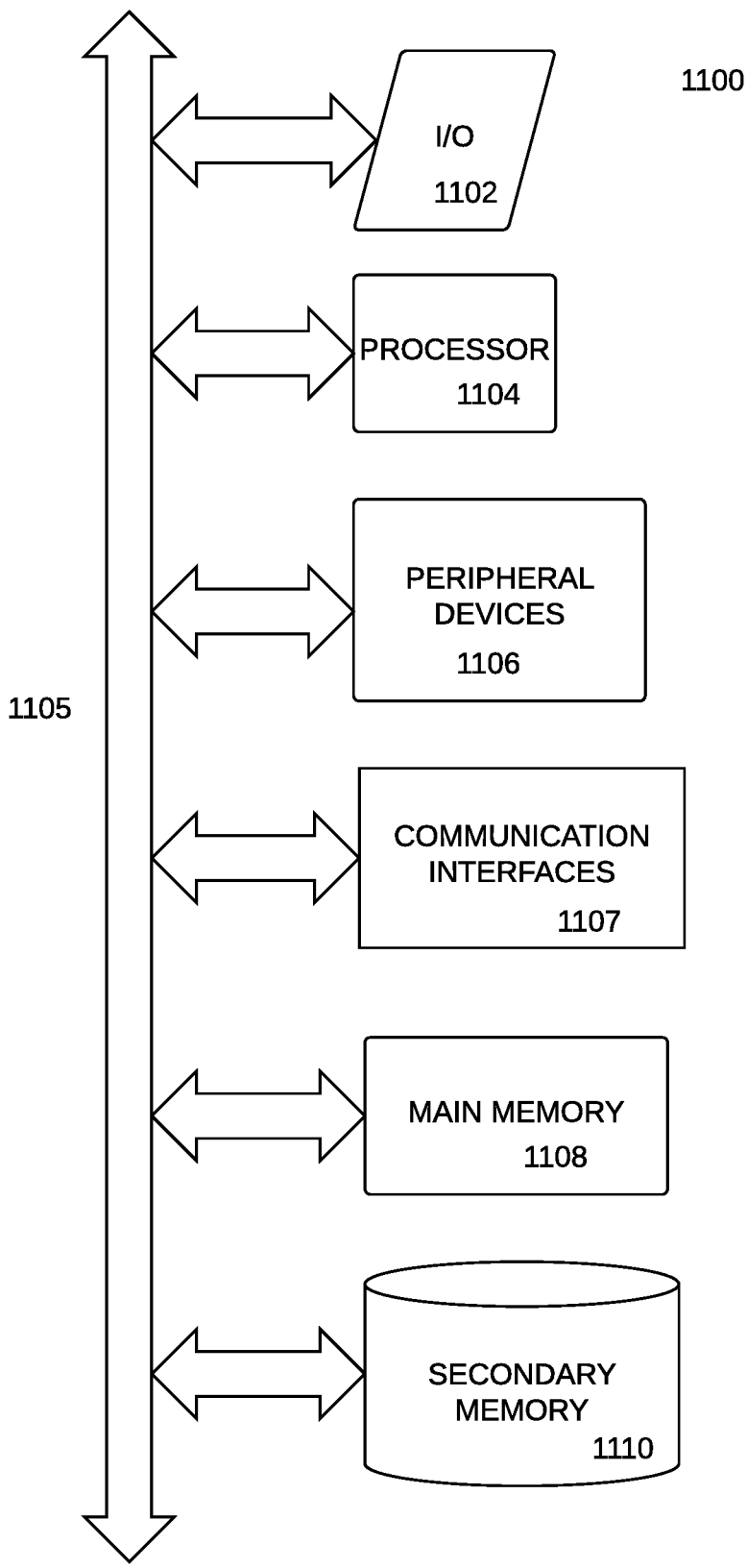
FIG. 11 illustrates an example of a computer system that may be used to execute program code to implement embodiments of the disclosure

FIG. 11 illustrates an example of a computer system 1100 that may be used to execute program code stored in a non-transitory computer readable medium (e.g., memory) in accordance with embodiments of the disclosure. The computer system includes an input/output subsystem 1102, which may be used to interface with human users and/or other computer systems depending upon the application. The I/O subsystem 1102 may include, e.g., a keyboard, mouse, graphical user interface, touchscreen, or other interfaces for input, and, e.g., an LED or other flat screen display, or other interfaces for output, including application program interfaces (APIs). Other elements of embodiments of the disclosure, such as the prediction engine may be implemented with a computer system like that of computer system 1100.

Program code may be stored in non-transitory media such as persistent storage in secondary memory 1110 or main memory 1108 or both. Main memory 1108 may include volatile memory such as random access memory (RAM) or non-volatile memory such as read only memory (ROM), as well as different levels of cache memory for faster access to instructions and data. Secondary memory may include persistent storage such as solid state drives, hard disk drives or optical disks. One or more processors 1104 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 1104. The processor(s) 1104 may include graphics processing units (GPUs) for handling computationally intensive tasks.

The processor(s) 1104 may communicate with external networks via one or more communications interfaces 1107, such as a network interface card, WiFi transceiver, etc. A bus 1105 communicatively couples the I/O subsystem 1102, the processor(s) 1104, peripheral devices 1106, communications interfaces 1107, memory 1108, and persistent storage 1110. Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 1100. In particular, the elements of the prediction engine and any other automated systems or devices described herein may be computer-implemented. Some elements and functionality may be implemented locally and others may be implemented in a distributed fashion over a network through different servers, e.g., in client-server fashion, for example. In particular, server-side operations may be made available to multiple clients in a software as a service (SaaS) fashion, as shown in FIG. 10.

Those skilled in the art will recognize that, in some embodiments, some of the operations described herein may be performed by human implementation, or through a combination of automated and manual means. When an operation is not fully automated, appropriate components of the prediction engine may, for example, receive the results of human performance of the operations rather than generate results through its own operational capabilities.

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as an acknowledgment or any form of suggestion that they constitute valid prior art or form part of the common general knowledge in any country in the world, or that they are disclose essential matter.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

In the claims below, a claim n reciting "any one of the preceding claims starting with claim x," shall refer to any one of the claims starting with claim x and ending with the immediately preceding claim (claim n–1). For example, if claim 35 were to recite "The system of any one of the preceding claims starting with claim 28" it would be referring to the system of any one of claims 28-34.

SELECTED EMBODIMENTS OF THE DISCLOSURE

1. A computer-implemented method for identifying organisms for production based at least in part upon determining one or more outlier detection parameters for identifying outlier objects from a collection of objects, the method comprising:
(a) identifying one or more candidate outlier objects from a data set based at least in part upon a first set of one or more outlier detection parameters, the data set comprising a set of performance metrics, each representing organism performance corresponding to an object of the collection of objects;
(b) determining a set of probability metrics, each probability metric representing a likelihood that the one or more candidate outlier objects belongs to an outlier class;
(c) processing the probability metrics within the set of probability metrics to generate a set of aggregate probability metrics;
(d) selecting a second set of one or more outlier detection parameters based at least in part upon magnitude of the aggregate probability metrics; and
(e) identifying one or more second outlier objects of the data set, based at least in part upon the second set of outlier detection parameters, for exclusion from consideration in predicting organism performance for the purpose of selecting organisms for production.

2. The method of embodiment 1, wherein the first set of outlier detection parameters includes an outlier detection threshold.

3. The method of any one of the preceding embodiments, wherein the second set of outlier detection parameters includes an outlier detection threshold.

4. The method of any one of the preceding embodiments, wherein identifying the second set of outlier detection parameters is based at least in part upon the magnitude of an aggregate probability metric of the set of aggregate probability metrics representing a greatest likelihood.

5. The method of any one of the preceding embodiments, wherein organism performance relates to production of a product of interest.

6. The method of any one of the preceding embodiments, wherein organism performance relates to yield.

7. The method of any one of the preceding embodiments, wherein determining a set of probability metrics comprises employing logistic regression, and the probability metric is a chance adjusted metric.

8. The method of any one of the preceding embodiments, wherein processing comprises processing the probability metrics by experiment to generate experiment-specific aggregate probability metrics.

9. The method of any one of the preceding embodiments, comprising jittering samples of the data set in a dimension orthogonal to a dimension of the organism performance in logistic regression space.

10. The method of any one of the preceding embodiments, further comprising:
excluding the one or more second outlier objects from the group of objects to form a sample set; and
predicting organism performance for organisms in the sample set.

11. The method of embodiment 10, further comprising:
selecting organisms from the sample set for production based at least in part upon the predicted organism performance.

12. The method of embodiment 11, further comprising producing the selected organisms.

13. The method of any one of the preceding embodiments, wherein identifying one or more candidate outlier objects is performed by each outlier detection algorithm of a set of outlier detection algorithms, the method further comprising:
generating a set of aggregate probability metrics for each algorithm of the set of outlier detection algorithms;
identifying the largest aggregate probability metric of the set of aggregate probability metrics; and
selecting the outlier detection algorithm associated with the largest aggregate probability metric as an optimal outlier detection algorithm.

14. The method of any one of the preceding embodiments, wherein each object represents a strain replicate, and identifying one or more candidate outlier objects comprises grouping the strain replicates in the data set by strain.

15. The method of any one of the preceding embodiments, wherein each object represents a strain replicate, and identifying one or more candidate outlier objects comprises grouping the strain replicates in the data set by plate.

16. The method of any one of the preceding embodiments, wherein each object represents a strain replicate, and identifying one or more candidate outlier objects comprises grouping the strain replicates in the data set by experiment.

17. An organism produced using any one of the methods of the preceding embodiments.

18. A system for identifying organisms for production based at least in part upon determining one or more outlier detection parameters for identifying outlier objects from a collection of objects, the system comprising:
one or more processors; and
one or more memories storing instructions, that when executed by at least one of the one or more processors, cause the system to:
(a) identify one or more candidate outlier objects from a data set based at least in part upon a first set of one or more outlier detection parameters, the data set comprising a set of performance metrics, each representing organism performance corresponding to an object of the collection of objects;
(b) determine a set of probability metrics, each probability metric representing a likelihood that the one or more candidate outlier objects belongs to an outlier class;
(c) process the probability metrics within the set of probability metrics to generate a set of aggregate probability metrics;
(d) select a second set of one or more outlier detection parameters based at least in part upon magnitude of the aggregate probability metrics; and
(e) identify one or more second outlier objects of the data set, based at least in part upon the second set of outlier detection parameters, for exclusion from consideration in predicting organism performance for the purpose of selecting organisms for production.

19. The system of embodiment 18, wherein the first set of outlier detection parameters includes an outlier detection threshold.

20. The system of any one of the preceding embodiments starting with embodiment 18, wherein the second set of outlier detection parameters includes an outlier detection threshold.

21. The system of any one of the preceding embodiments starting with embodiment 18, wherein identifying the second set of outlier detection parameters is based at least in part upon the magnitude of an aggregate probability metric of the set of aggregate probability metrics representing a greatest likelihood.
22. The system of any one of the preceding embodiments starting with embodiment 18, wherein organism performance relates to production of a product of interest.
23. The system of embodiment 22, wherein organism performance relates to yield.
24. The system of any one of the preceding embodiments starting with embodiment 18, wherein determining a set of probability metrics comprises employing logistic regression, and the probability metric is a chance adjusted metric.
25. The system of any one of the preceding embodiments starting with embodiment 18, wherein processing comprises processing the probability metrics by experiment to generate experiment-specific aggregate probability metrics.
26. The system of any one of the preceding embodiments starting with embodiment 18, wherein the one or more memories store instructions that, when executed by at least one of the one or more processors, cause the system to jitter samples of the data set in a dimension orthogonal to a dimension of the organism performance in logistic regression space.
27. The system of any one of the preceding embodiments starting with embodiment 18, wherein the one or more memories store instructions that, when executed by at least one of the one or more processors, cause the system to:
exclude the one or more second outlier objects from the group of objects to form a sample set; and
predict organism performance for organisms in the sample set.
28. The system of embodiment 27, wherein the one or more memories store instructions that, when executed by at least one of the one or more processors, cause the system to:
select organisms from the sample set for production based at least in part upon the predicted organism performance.
29. The system of embodiment 28, wherein the one or more memories store instructions that, when executed by at least one of the one or more processors, cause the system to produce the selected organisms.
30. The system of any one of the preceding embodiments starting with embodiment 18, wherein identifying one or more candidate outlier object is performed by each outlier detection algorithm of a set of outlier detection algorithms, wherein the one or more memories store further instructions for:
generating a set of aggregate probability metrics for each algorithm of the set of outlier detection algorithms;
identifying the largest aggregate probability metric of the set of aggregate probability metrics; and
selecting the outlier detection algorithm associated with the largest aggregate probability metric as an optimal outlier detection algorithm.
31. The system of any one of the preceding embodiments starting with embodiment 18, wherein each object represents a strain replicate, and identifying one or more candidate outlier objects comprises grouping the strain replicates in the data set by strain.
32. The system of any one of the preceding embodiments starting with embodiment 18, wherein each object represents a strain replicate, and identifying one or more candidate outlier objects comprises grouping the strain replicates in the data set by plate.
33. The system of any one of the preceding embodiments starting with embodiment 18, wherein each object represents a strain replicate, and identifying one or more candidate outlier objects comprises grouping the strain replicates in the data set by experiment.
34. An organism produced using the system of any one of the preceding embodiments starting with embodiment 18.
35. One or more non-transitory computer-readable media storing instructions for identifying organisms for production based at least in part upon determining one or more outlier detection parameters for identifying outlier objects from a collection of objects, wherein the instructions, when executed by one or more computing devices, cause at least one of the one or more computing devices to:
(a) identify one or more candidate outlier objects from a data set based at least in part upon a first set of one or more outlier detection parameters, the data set comprising a set of performance metrics, each representing organism performance corresponding to an object of the collection of objects;
(b) determine a set of probability metrics, each probability metric representing a likelihood that the one or more candidate outlier objects belongs to an outlier class;
(c) process the probability metrics within the set of probability metrics to generate a set of aggregate probability metrics;
(d) select a second set of one or more outlier detection parameters based at least in part upon magnitude of the aggregate probability metrics; and
(e) identify one or more second outlier objects of the data set, based at least in part upon the second set of outlier detection parameters, for exclusion from consideration in predicting organism performance for the purpose of selecting organisms for production.
36. The one or more non-transitory computer-readable media of embodiment 35, wherein the first set of outlier detection parameters includes an outlier detection threshold.
37. The one or more non-transitory computer-readable media of any one of the preceding embodiments starting with embodiment 35, wherein the second set of outlier detection parameters includes an outlier detection threshold.
38. The one or more non-transitory computer-readable media of any one of the preceding embodiments starting with embodiment 35, wherein identifying the second set of outlier detection parameters is based at least in part upon the magnitude of an aggregate probability metric of the set of aggregate probability metrics representing a greatest likelihood.
39. The one or more non-transitory computer-readable media of any one of the preceding embodiments starting with embodiment 35, wherein organism performance relates to production of a product of interest.
40. The one or more non-transitory computer-readable media of any one of the preceding embodiments starting with embodiment 35, wherein organism performance relates to yield.
41. The one or more non-transitory computer-readable media of any one of the preceding embodiments starting with embodiment 35, wherein determining a set of probability metrics comprises employing logistic regression, and the probability metric is a chance adjusted metric.

42. The one or more non-transitory computer-readable media of any one of the preceding embodiments starting with embodiment 35, wherein processing comprises processing the probability metrics by experiment to generate experiment-specific aggregate probability metrics.

43. The one or more non-transitory computer-readable media of any one of the preceding embodiments starting with embodiment 35, wherein the one or more non-transitory computer-readable media store instructions that, when executed by at least one of the one or more computing devices, cause at least one of the one or more computing devices to jitter samples of the data set in a dimension orthogonal to a dimension of the organism performance in logistic regression space.

44. The one or more non-transitory computer-readable media of any one of the preceding embodiments starting with embodiment 35, wherein the one or more non-transitory computer-readable media store instructions that, when executed by at least one of the one or more computing devices, cause at least one of the one or more computing devices to:
exclude the one or more second outlier objects from the group of objects to form a sample set; and
predict organism performance for organisms in the sample set.

45. The one or more non-transitory computer-readable media of embodiment 44, wherein the one or more non-transitory computer-readable media store instructions that, when executed by at least one of the one or more computing devices, cause at least one of the one or more computing devices to:
select organisms from the sample set for production based at least in part upon the predicted organism performance.

46. The one or more non-transitory computer-readable media of embodiment 45, wherein the one or more non-transitory computer-readable media store instructions that, when executed by at least one of the one or more computing devices, cause at least one of the one or more computing devices to facilitate production of the selected organisms.

47. The one or more non-transitory computer-readable media of any one of the preceding embodiments starting with embodiment 35, wherein identifying one or more candidate outlier objects is performed by each outlier detection algorithm of a set of outlier detection algorithms, wherein the one or more non-transitory computer-readable media store instructions that, when executed by at least one of the one or more computing devices, cause at least one of the one or more computing devices to:
generate a set of aggregate probability metrics for each algorithm of the set of outlier detection algorithms;
identify the largest aggregate probability metric of the set of aggregate probability metrics; and
select the outlier detection algorithm associated with the largest aggregate probability metric as an optimal outlier detection algorithm.

48. The one or more non-transitory computer-readable media of any one of the preceding embodiments starting with embodiment 35, wherein each object represents a strain replicate, and identifying one or more candidate outlier objects comprises grouping the strain replicates in the data set by strain.

49. The one or more non-transitory computer-readable media of any one of the preceding embodiments starting with embodiment 35, wherein each object represents a strain replicate, and identifying one or more candidate outlier objects comprises grouping the strain replicates in the data set by plate.

50. The one or more non-transitory computer-readable media of any one of the preceding embodiments starting with embodiment 35, wherein each object represents a strain replicate, and identifying one or more candidate outlier objects comprises grouping the strain replicates in the data set by experiment.

51. An organism produced by executing the instructions stored on one or more non-transitory computer-readable media of any one of the preceding embodiments starting with embodiment 35.

What is claimed is:

1. A method for identifying organisms for production based at least in part upon determining one or more outlier detection parameters for identifying outlier objects from a collection of objects, the method comprising:
   (a) identifying, using one or more processors, one or more candidate outlier objects from a data set based at least in part upon a first set of one or more outlier detection parameters, the data set comprising a set of performance metrics, each representing organism performance corresponding to an object of the collection of objects, wherein each object corresponds to a first level of granularity, and identifying one or more candidate outlier objects comprises grouping the members in the data set at a second level of granularity coarser than the first level of granularity;
   (b) determining, using one or more processors, a set of probability metrics, each probability metric representing a likelihood that the one or more candidate outlier objects belongs to an outlier class;
   (c) processing, using one or more processors, the probability metrics within the set of probability metrics to generate a set of aggregate probability metrics;
   (d) selecting, using one or more processors, a second set of one or more outlier detection parameters based at least in part upon magnitude of the aggregate probability metrics; and
   (e) identifying, using one or more processors, one or more second outlier objects of the data set, based at least in part upon the second set of outlier detection parameters, for exclusion from consideration in predicting organism performance for the purpose of identifying organisms for production.

2. The method of claim 1, wherein based on the organisms identified for production, one or more of the identified organisms are produced.

3. An organism selected from the organisms identified for production using the method of claim 1.

4. A system for identifying organisms for production based at least in part upon determining one or more outlier detection parameters for identifying outlier objects from a collection of objects, the system comprising:
one or more memories storing instructions; and
one or more processors for executing the instructions to cause the system to:
   (a) identify one or more candidate outlier objects from a data set based at least in part upon a first set of one or more outlier detection parameters, the data set comprising a set of performance metrics, each representing organism performance corresponding to an object of the collection of objects, wherein each object corresponds to a first level of granularity, and identifying one or more candidate outlier objects comprises grouping the members in the data set at a second level of granularity the same as or coarser than the first level of granularity;
(b) determine a set of probability metrics, each probability metric representing a likelihood that the one or more candidate outlier objects belongs to an outlier class;
(c) process the probability metrics within the set of probability metrics to generate a set of aggregate probability metrics;
(d) select a second set of one or more outlier detection parameters based at least in part upon magnitude of the aggregate probability metrics; and
(e) identify one or more second outlier objects of the data set, based at least in part upon the second set of outlier detection parameters, for exclusion from consideration in predicting organism performance for the purpose of identifying organisms for production.

5. The system of claim 4, wherein based on the organisms identified for production, one or more of the identified organisms are produced.

6. An organism selected from the organisms that are identified for production using the method of claim 4.

7. One or more non-transitory computer-readable media storing instructions for identifying organisms for production based at least in part upon determining one or more outlier detection parameters for identifying outlier objects from a collection of objects, wherein the instructions, when executed by one or more computing devices, cause at least one of the one or more computing devices to:
(a) identify one or more candidate outlier objects from a data set based at least in part upon a first set of one or more outlier detection parameters, the data set comprising a set of performance metrics, each representing organism performance corresponding to an object of the collection of objects, wherein each object corresponds to a first level of granularity, and identifying one or more candidate outlier objects comprises grouping the members in the data set at a second level of granularity the same as or coarser than the first level of granularity;
(b) determine a set of probability metrics, each probability metric representing a likelihood that the one or more candidate outlier objects belongs to an outlier class;
(c) process the probability metrics within the set of probability metrics to generate a set of aggregate probability metrics;
(d) select a second set of one or more outlier detection parameters based at least in part upon magnitude of the aggregate probability metrics; and
(e) identify one or more second outlier objects of the data set, based at least in part upon the second set of outlier detection parameters, for exclusion from consideration in predicting organism performance for the purpose of identifying organisms for production.

8. The one or more non-transitory computer-readable media of claim 7, wherein the first set of outlier detection parameters includes an outlier detection threshold.

9. The one or more non-transitory computer-readable media of claim 7, wherein the second set of outlier detection parameters includes an outlier detection threshold.

10. The one or more non-transitory computer-readable media of claim 7, wherein identifying the second set of outlier detection parameters is based at least in part upon the magnitude of an aggregate probability metric of the set of aggregate probability metrics representing a greatest likelihood.

11. The one or more non-transitory computer-readable media of claim 7, wherein organism performance relates to production of a product of interest.

12. The one or more non-transitory computer-readable media of claim 11 wherein organism performance relates to yield.

13. The one or more non-transitory computer-readable media of claim 7, wherein determining a set of probability metrics comprises employing logistic regression, and the probability metric is a chance adjusted metric.

14. The one or more non-transitory computer-readable media of claim 7, wherein processing comprises processing the probability metrics by experiment to generate experiment-specific aggregate probability metrics.

15. The one or more non-transitory computer-readable media of claim 7, wherein the one or more non-transitory computer-readable media store instructions that, when executed by at least one of the one or more computing devices, cause at least one of the one or more computing devices to jitter samples of the data set in a dimension orthogonal to a dimension of the organism performance in logistic regression space.

16. The one or more non-transitory computer-readable media of claim 7, wherein the one or more non-transitory computer-readable media store instructions that, when executed by at least one of the one or more computing devices, cause at least one of the one or more computing devices to:
exclude the one or more second outlier objects from the group of objects to form a sample set; and
predict organism performance for organisms in the sample set.

17. The one or more non-transitory computer-readable media of claim 7, wherein the one or more non-transitory computer-readable media store instructions that, when executed by at least one of the one or more computing devices, cause at least one of the one or more computing devices to:
select organisms from the sample set for production based at least in part upon the predicted organism performance.

18. The one or more non-transitory computer-readable media of claim 17, wherein the organisms selected from the sample set are produced.

19. The one or more non-transitory computer-readable media of claim 7, wherein identifying one or more candidate outlier objects is performed by each outlier detection algorithm of a set of outlier detection algorithms, wherein the one or more non-transitory computer-readable media store instructions that, when executed by at least one of the one or more computing devices, cause at least one of the one or more computing devices to:
generate a set of aggregate probability metrics for each algorithm of the set of outlier detection algorithms;
identify the largest aggregate probability metric of the set of aggregate probability metrics; and
select the outlier detection algorithm associated with the largest aggregate probability metric as an optimal outlier detection algorithm.

20. The one or more non-transitory computer-readable media of claim 7, wherein each object represents a strain replicate, and identifying one or more candidate outlier objects comprises grouping the strain replicates in the data set by strain.

21. The one or more non-transitory computer-readable media of claim 7, wherein each object represents a strain replicate, and identifying one or more candidate outlier objects comprises grouping the strain replicates in the data set by plate.

22. The one or more non-transitory computer-readable media of claim 7, wherein each object represents a strain replicate, and identifying one or more candidate outlier objects comprises grouping the strain replicates in the data set by experiment.

23. The one or more non-transitory computer-readable media of claim 7, wherein based on the organisms identified for production, one or more of the identified organisms are produced.

24. An organism selected from the organisms that are identified for production by executing the instructions stored on one or more non-transitory computer-readable media of claim 7.

25. A method for producing organisms, wherein the organisms are identified by:
(a) identifying, using one or more processors, one or more candidate outlier objects from a data set based at least in part upon a first set of one or more outlier detection parameters, the data set comprising a set of performance metrics, each representing organism performance corresponding to an object of the collection of objects, wherein each object corresponds to a first level of granularity, and identifying one or more candidate outlier objects comprises grouping the members in the data set at a second level of granularity coarser than the first level of granularity;
(b) determining, using one or more processors, a set of probability metrics, each probability metric representing a likelihood that the one or more candidate outlier objects belongs to an outlier class;
(c) processing, using one or more processors, the probability metrics within the set of probability metrics to generate a set of aggregate probability metrics;
(d) selecting, using one or more processors, a second set of one or more outlier detection parameters based at least in part upon magnitude of the aggregate probability metrics; and
(e) identifying, using one or more processors, one or more second outlier objects of the data set, based at least in part upon the second set of outlier detection parameters, for exclusion from consideration in predicting organism performance for the purpose of identify organisms for production, the method comprising producing one or more of the identified organisms.

* * * * *